United States Patent [19]
Weston

[11] Patent Number: 6,026,698
[45] Date of Patent: Feb. 22, 2000

[54] TRANSMISSION AND SHIFT MECHANISM

[76] Inventor: Bevan Weston, 16637 N. 21st St., Phoenix, Ariz. 85022

[21] Appl. No.: 08/950,854

[22] Filed: Oct. 15, 1997

Related U.S. Application Data

[63] Continuation-in-part of application No. 08/689,733, Aug. 13, 1996, Pat. No. 5,816,101.

[51] Int. Cl.$^7$ .................................................. F16H 59/04
[52] U.S. Cl. ........................................... 74/335; 74/473.26
[58] Field of Search ............................. 74/331, 325, 333, 74/335, 483 R, 473.25, 473.26

[56] References Cited

U.S. PATENT DOCUMENTS

| | | |
|---|---|---|
| 1,317,191 | 9/1919 | Jensen . |
| 2,953,035 | 9/1960 | Herr, Jr. . |
| 3,138,965 | 6/1964 | Brey et al. . |
| 3,581,594 | 6/1971 | Longshore ........................... 74/473.26 |
| 3,974,711 | 8/1976 | Hurst, Jr. . |
| 3,987,879 | 10/1976 | Longshore et al. .............. 74/473.26 X |
| 4,023,443 | 5/1977 | Usui et al. . |
| 4,068,537 | 1/1978 | Wolfe . |
| 4,083,420 | 4/1978 | Kurisu .............................. 74/473.26 X |
| 4,328,712 | 5/1982 | Osborn . |
| 4,406,356 | 9/1986 | Prince .............................. 74/473.11 X |
| 4,485,689 | 12/1984 | Cambria . |
| 4,531,418 | 7/1985 | Takahashi et al. . |
| 4,550,628 | 11/1985 | Yarnell . |
| 4,693,135 | 9/1987 | LaRocca . |
| 4,873,882 | 10/1989 | Goscenski, Jr. . |
| 4,914,969 | 4/1990 | Lieb . |
| 5,030,179 | 7/1991 | Ganoung . |
| 5,038,627 | 8/1991 | Schwaiger et al. ....................... 74/335 |
| 5,052,245 | 10/1991 | Kigoshi . |
| 5,179,869 | 1/1993 | Reynolds .............................. 74/473.1 |
| 5,216,931 | 6/1993 | Hirsch et al. ......................... 74/335 X |
| 5,305,240 | 4/1994 | Davis et al. ......................... 74/335 X |
| 5,309,782 | 5/1994 | Seaman . |
| 5,390,561 | 2/1995 | Stine . |
| 5,471,893 | 12/1995 | Newbigging . |
| 5,522,476 | 6/1996 | Holman ................................. 74/467 X |

*Primary Examiner*—Dirk Wright
*Attorney, Agent, or Firm*—Morgan & Finnegan, L.L.P.

[57] ABSTRACT

An shifting mechanism located outside a transmission housing which includes a gear lever and shifting rails. The shift rails are responsive to the gear lever and operate in a manner to allow for movement of a shifting rail and at the same time prevent movement of the other shifting rails.

21 Claims, 22 Drawing Sheets

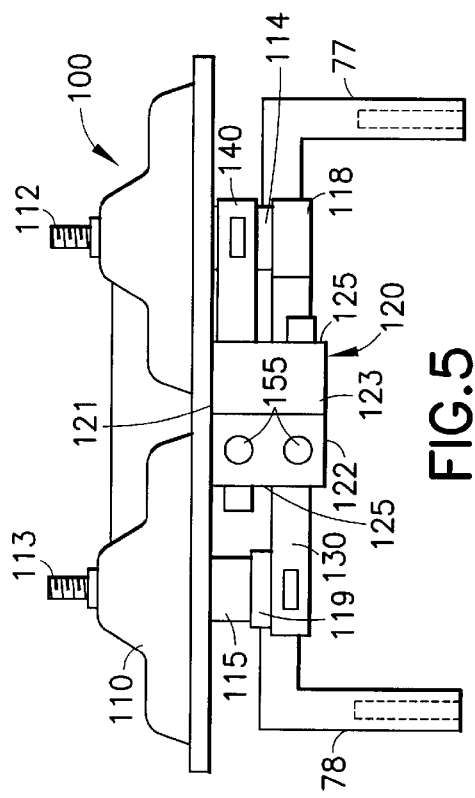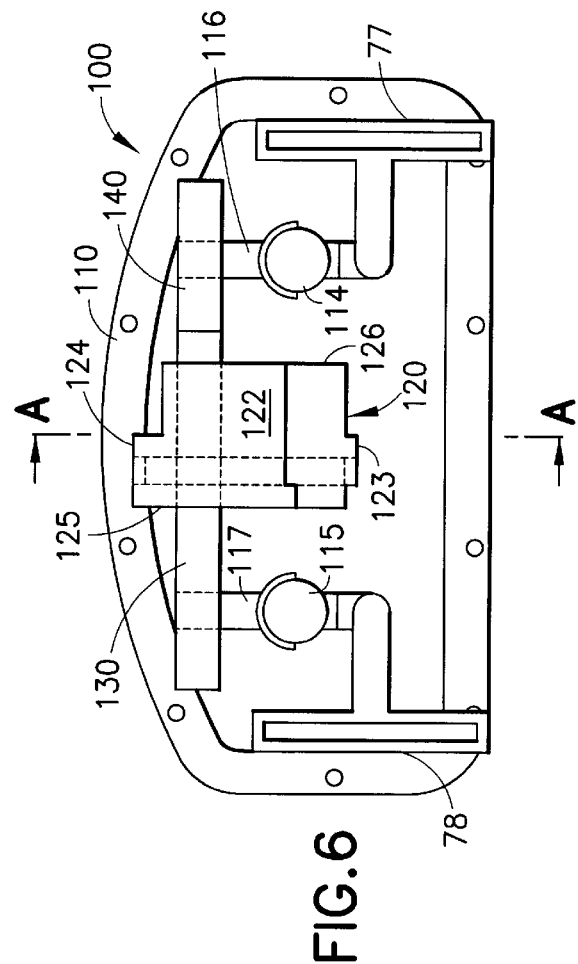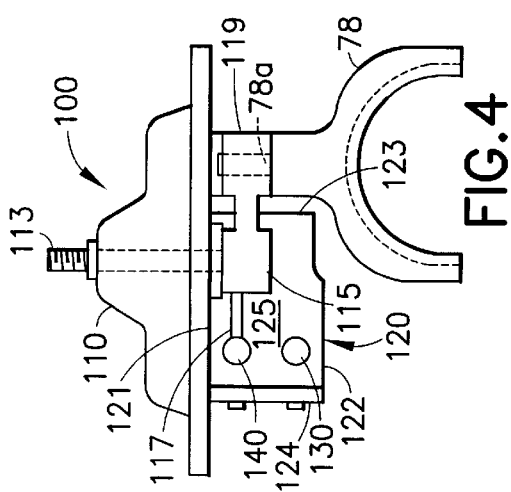

TRANSMISSION AND SHIFT MECHANISM

RELATED APPLICATIONS

This application is a continuation-in-part of U.S. application Ser. No. 08/689,733, filed on Aug. 13, 1996 now U.S. Pat. No. 5,816,101.

BACKGROUND OF THE INVENTION

The present invention relates generally to the field of transmissions, and more particularly to an improved transmission and shift mechanism for a motor vehicle.

Manual transmissions of the type including a lay shaft are well known in the art. Such transmissions are often utilized in connection with high performance automobiles, such as those used in connection with professional racing. In this regard, to facilitate quicker acceleration from a rolling start and to minimize the power necessary to accelerate the automobile, it is also known to use a reduction or drop gear on the lay shaft of the transmission in order to increase the rotational speed of the gear train within the transmission.

Manually shifting gears within transmissions of this type under the rigors of racing conditions, however, is frequently problematic due to the inability to precisely control the disengagement of one set of gears before engagement a second set of gears. For example, in a conventional 4-speed manual transmission, it is known to utilize a shift mechanism wherein a first shift fork is connected to and moves a first clutch ring or synchromesh unit to engage a first or second speed driven gear, and a second shift fork is connected to and moves a second clutch ring or synchromesh unit to engage a third or fourth speed driven gear of the transmission. However, such conventional shift mechanisms do not generally preclude engagement of the third or fourth speed gears while the first or second speed gears are still engaged, or vice versa, which simultaneous engagement may cause significant damage to the components of the transmission.

In addition, once damaged, these conventional transmissions do not readily provide ease in which to replace damaged components (such as gears situated on the lay shaft). Accordingly, significant effort and expense is often required in repairing or replacing such damaged transmissions.

SUMMARY OF THE INVENTION

In accordance with the present invention there is provided an embodiment comprising: a gear selecting lever mounted in a casing located external to a transmission housing, a first shift rail operatively connected to the gear selecting lever, a second shift rail operatively connected to the gear selecting lever, and the first and second shift rails including first and second lock-out detents.

In accordance with the present invention there is provided an embodiment comprising: a gear selecting lever mounted in a casing located external to a transmission housing, a first and second rail engagement ends operatively connected to the gear selecting lever and located in a chamber of the casing; a first and second shift rails operatively connected to the first and second rail engagement ends; and a viscous liquid surrounding the rail engagement ends.

In accordance with the present invention there is provided an embodiment comprising: a gear selecting lever mounted in a casing located external to a transmission housing, first and second shift rails operatively connected to the gear selecting lever; and a first plunger to control movement of the gear selecting lever.

BRIEF DESCRIPTION OF THE DRAWINGS

FIG. 4 is a side elevation view of a shift mechanism for use in accordance with the transmission illustrated in FIG. 1;

FIG. 5 is a front elevation view of the shift mechanism illustrated in FIG. 4;

FIG. 6 is a bottom plan view of the shift mechanism illustrated in FIG. 4;

DESCRIPTION OF THE PREFERRED EMBODIMENTS

Figure 1:
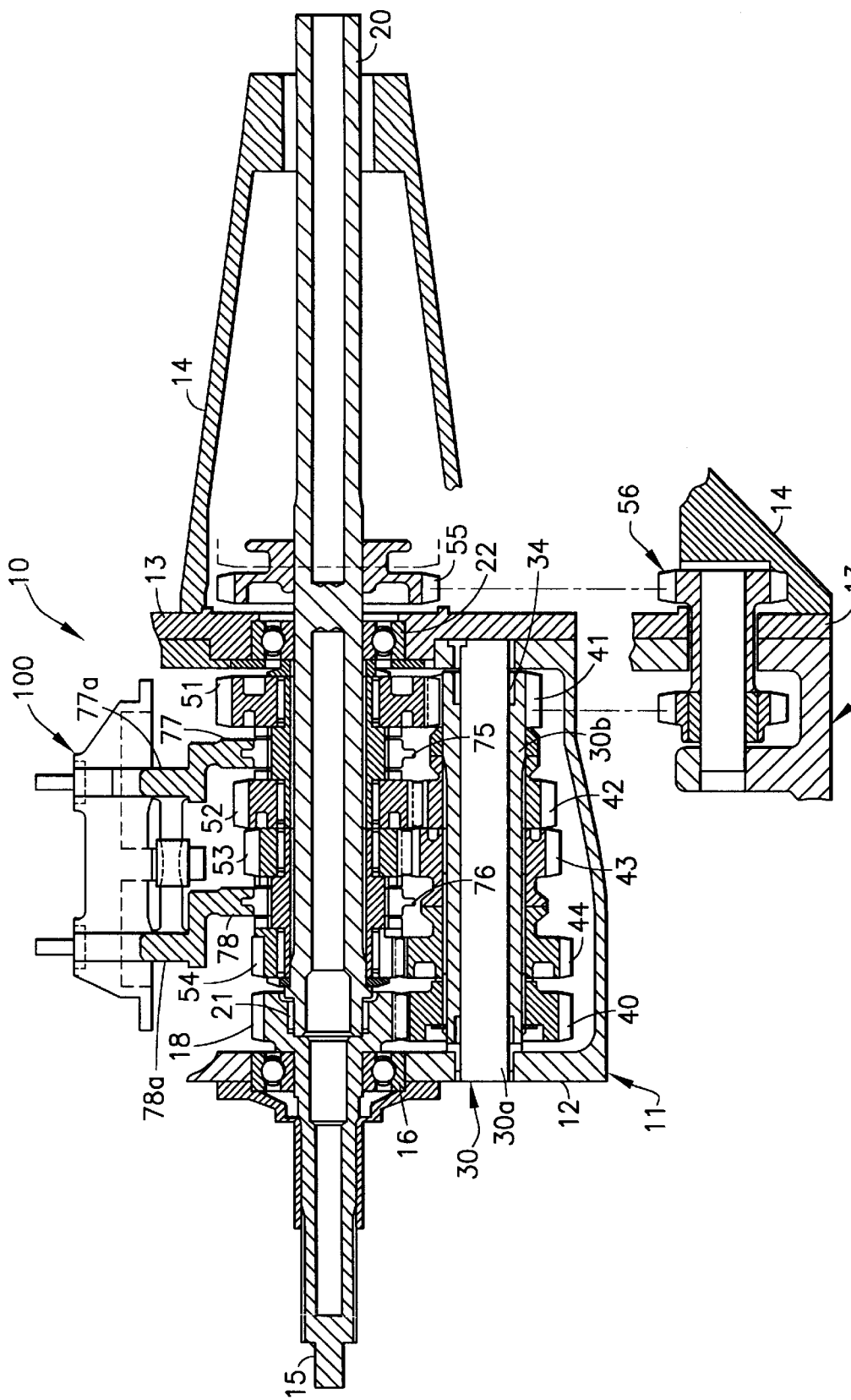
FIG. 1 is a elevational cross-sectional view of a transmission in accordance with the present invention.
Figure 2:
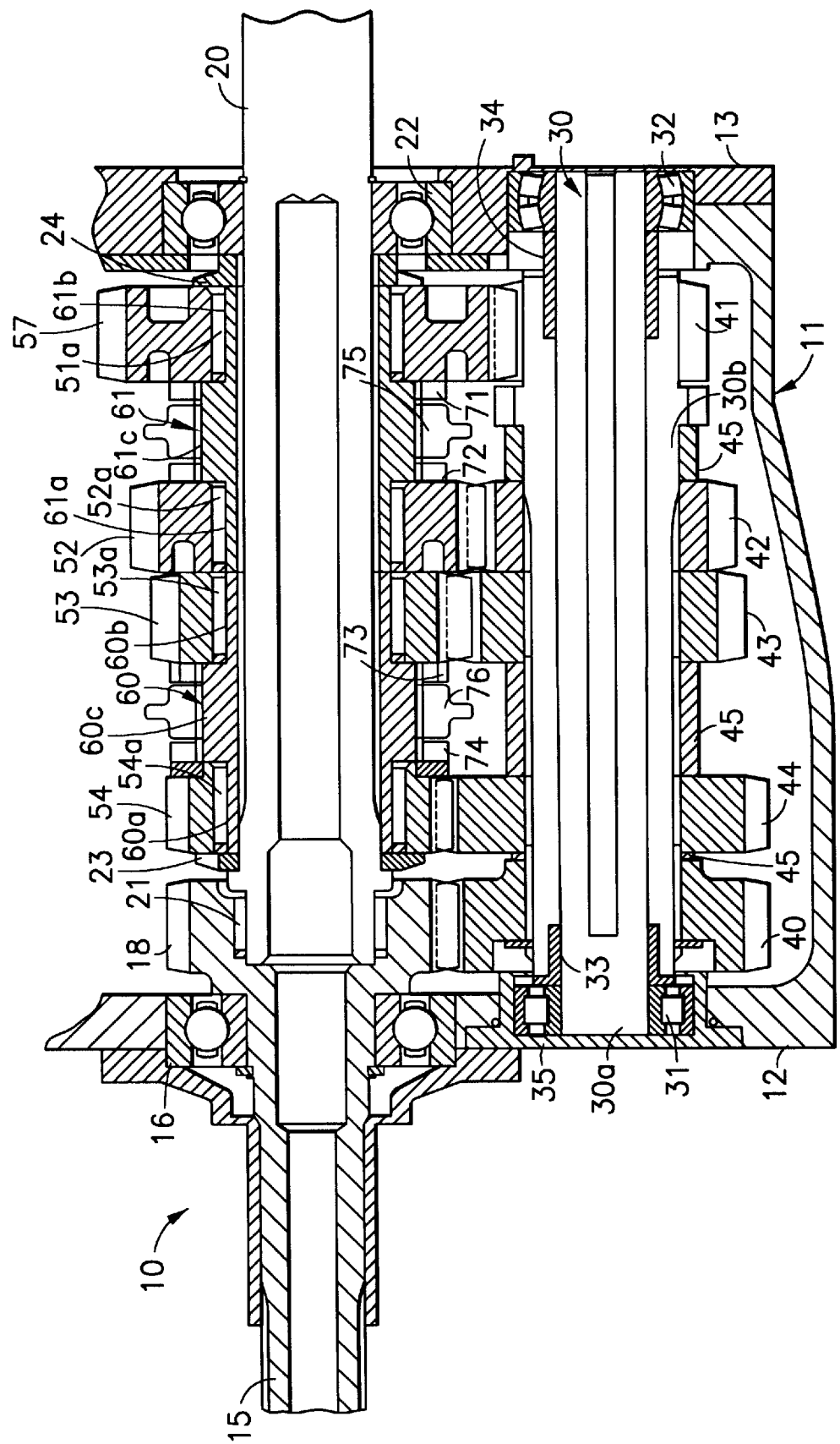
FIG. 2 is an enlarged cross-sectional view of the transmission illustrated in FIG. 1.
Figure 3:
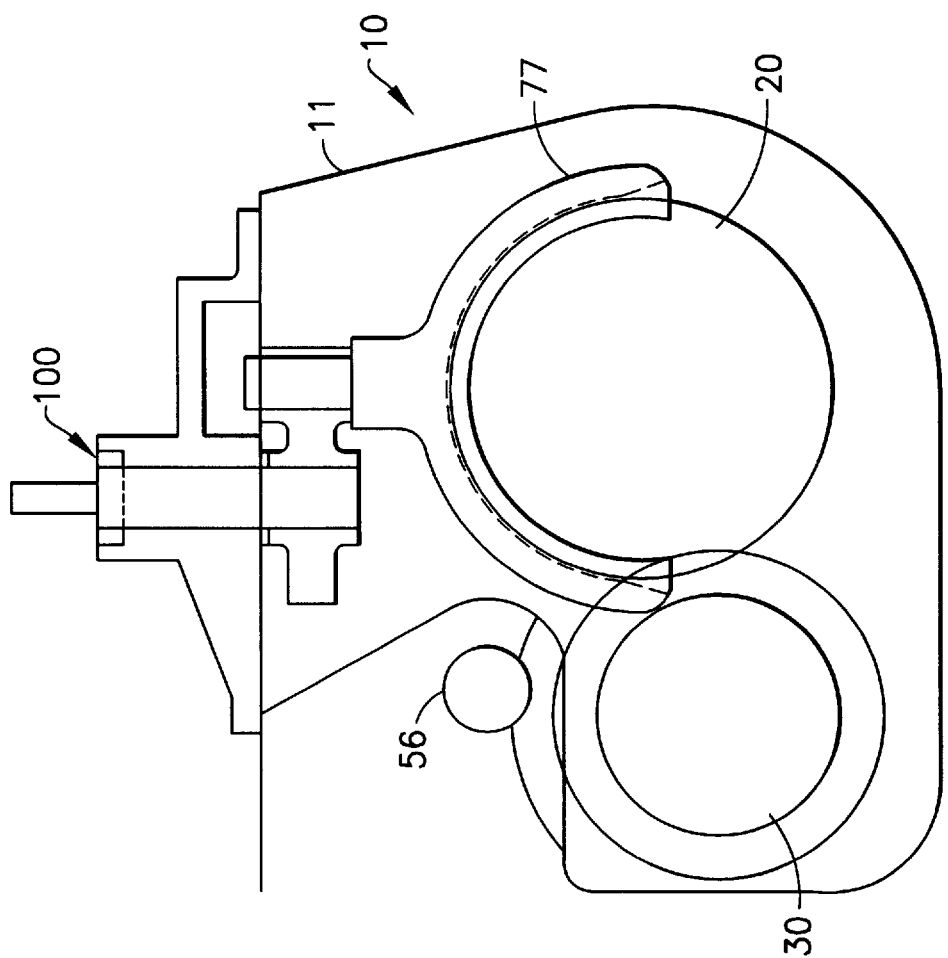
FIG. 3 is a end elevational cross-sectional view of the transmission illustrated in FIG. 1.

Referring to the drawings, and more specifically to FIGS. 1–3 thereof, there is illustrated a 4-speed manual transmission 10 for an automobile in accordance with the present invention. The transmission 10 includes a casing or bell housing 11 having a front face 12 and rear face 13. A rear extension 14 is secured to the rear face 13 of casing 11.

An input shaft 15 is received within and rotatably supported relative the casing 12 by antifriction bearing 16. The input shaft 15 receives driving torque in a conventional manner from the crankshaft (not illustrated) of the internal combustion engine in a motor vehicle. Antifriction bearing 16 is preferably a spherical roller bearing having rolling elements between an inner and an outer race of the bearing 16. The outer race is preferably press fit within an opening in the front face 12 of casing 11 and the inner race is preferably press fit onto input shaft 15.

An input gear 18 is located within the casing 12 at the distal end of the input shaft 15 and is preferably integrally formed as part of the input shaft 15. The distal end of the input shaft 15 also has a bore therein for receiving a proximal end portion of an output shaft 20 of the transmission 10. The proximal end of the output shaft 20 is rotatably supported by antifriction bearing 21, which bearing is disposed within the bore in the distal end of input shaft 15. The output shaft 20 is also rotatably supported relative the casing 11 by antifriction bearing 22, which is preferably press fit within an opening in the rear face 13 of casing 11. The distal or rearward end of output shaft 20 projects from the rear extension 14 to provide output driving torque from the transmission 10 to the motor vehicle.

Input shaft 15 and output shaft 20 are co-axially aligned with one another and are independently rotatable relative casing 11. In order to minimize the mass associated with input shaft 15 and output shaft 20, both shafts 15, 20 are rifled drilled in various locations throughout their respective lengths.

Also rotatably disposed within the casing 11 is a transmission lay shaft 30 having an axis of rotation parallel to that of input shaft 15 and output shaft 20. Referring to FIG. 2, the proximal end of lay shaft 30 is rotatably supported relative casing 11 by antifriction being 31 and the distal end of lay shaft 30 is rotatably supported relative casing 11 by antifriction bearing 32. Antifriction bearings 31 and 32 are preferably spherical roller bearings having rolling elements between an inner and an outer race. The outer race of bearing 31 is preferably press fit within a bearing housing 35, which is removably secured to the front face 12 of the casing 11. The inner race of bearing 31 is preferably press fit onto lay shaft 30. Similarly, the outer race of bearing 32 is preferably press fit within an opening in the rear face 13 of casing 11 and the inner race of bearing 32 is preferably press fit onto lay shaft 30.

The lay shaft 30 is preferably formed as two components: an elongated pin member 30a and an outer sleeve member 30b rotatably supported by the pin member 30a. The lay shaft pin member 30a is an elongated member that is sufficiently rigid and is preferably rifled drilled throughout most of its length to minimize the mass associated with lay shaft 30. The outer sleeve member 30b of lay shaft 30 includes a bore therethrough having a bore diameter slightly larger than the outside diameter of pin member 30a so that pin member 30a may be received within the bore of sleeve member 30b. Outer sleeve member 30b is shorter in length than pin member 30a and is rotatable relative to pin member 30a by means of antifriction bearings 33, 34 that are received within respective countersinks at each end of sleeve member 30b.

The lay shaft 30 also includes a reduction or drop gear 40, a first speed drive gear 41, a second speed drive gear 42, a third speed drive gear 43 and a fourth speed drive gear 44. Preferably, first drive gear 41 is formed integral with lay shaft sleeve 30b, and drop gear 40 and second through fourth drive gears 42–44 are slidably affixed in the axial direction on splines formed in the outer surface of lay shaft sleeve member 30b so that gears 40, 42–44 (and spacer members 45) are readily removable from lay shaft 30. Cylindrical spacer members 45 of sufficient length may also slidably received in the axial direction on splines in the outer surface of sleeve member 30b and may be positioned between adjacent gears on the lay shaft to preclude axial movement of the gears 40–44 relative one another. Accordingly, reduction gear 40 and first through fourth drive gears 41–44 rotate with lay shaft sleeve member 30b and are generally non-rotatable relative sleeve member 30b.

The input gear 18 of input shaft 15 is continually in toothed or meshing engagement with and operable to drive reduction gear 40 of lay shaft 30, which in turn causes lay shaft sleeve member 30b and first through fourth gears 41–44 to rotate along with drop gear 40. The reduction gear 40 is larger in diameter (and has a higher number of teeth) than input gear 18, thereby allowing the gear train of the transmission 10 to rotate at a higher rate of speed to provide greater inertia and requiring less power to accelerate the motor vehicle.

To facilitate efficient and convenient inspection and replacement of the lay shaft 30, reduction gear 40 and/or first through fourth drive gears 41–44, the bearing housing 35 is readily removable from the front face 12 of transmission 10. Upon removal of housing 35, the lay shaft 35 and accompanying gears 40–44 can easily be accessed and removed from transmission 10. Because the reduction gear 40 and second through fourth gears 42–44 are in splined engagement with lay shaft sleeve 30b, such splined gears may readily be replaced by substituting a new set of gears 40, 42–44 on the lay shaft sleeve 30b, which can be installed back into the casing 11 in a manner similar to the removal of the lay shaft and gears in the first instance.

Referring now to FIGS. 1 and 3, a reverse gear 55 is provided on output shaft 20 to selectively engage with a reverse idler assembly 56 to provide reverse drive capability with resect to transmission 10.

Now, referring to FIG. 2, first, second, third and fourth speed driven gears 51–54 are rotatably mounted on output shaft 20. Preferably, generally cylindrically-shaped first and second hubs 60, 61 are affixed to output shaft 20 by sliding engagement of splines formed in a portion of the outer surface of output shaft 20 with complimentary features formed in the bore through hubs 60, 61. The hubs 60, 61 are positioned adjacent one another on output shaft 20 and are retained against axial movement on shaft 20 by thrust washers 23, 24.

Each end of hubs 60, 61 includes a reduced outside diameter portion 60a, 60b, 61a, 61b relative to a raised central portion 60c, 61c. First through fourth speed driven gears 51–54 are rotatably mounted via antifriction bearings 51a–54a on the respective reduced portions 60a, 60b, 61a, 61b of hubs 60, 61. That is, first speed driven gear 51 is rotatably mounted on reduced portion 61b of hub 61, second speed driven gear 52 is rotatably mounted on reduced portion 61a of hub 61, third speed driven gear 53 is rotatably mounted on reduced portion 60b of hub 60, and fourth speed driven gear 54 is rotatably mounted on reduced portion 60a of hub 60. As such, first through fourth speed driven gears 51–54 are freely rotatable relative output shaft 20 by antifriction bearings 51a–54a, respectively. According to the present invention, it is preferred that the teeth on gears 18, 40–44, 51–54 be straight cut. However, it is understood that the present invention is not limited to transmissions with straight cut gear teeth and that other gear tooth configurations such as beveled teeth or the like are equally applicable to the invention.

As illustrated in FIGS. 1 and 2, first speed drive gear 41 is continually in toothed or meshing engagement with and operable to drive first speed driven gear 51 of output shaft 20 to provide a first speed gear ratio. Second speed drive gear 42 is continually in toothed or meshing engagement with and operable to drive second speed driven gear 52 of output shaft 20 to provide a second speed gear ratio. Third speed drive gear 43 is continually in toothed or meshing engagement with and operable to drive third speed driven gear 53 of output shaft 20 to provide a third speed gear ratio. Fourth speed drive gear 44 is continually in toothed or meshing engagement with and operable to drive fourth speed driven gear 54 of output shaft 20 to provide a fourth speed gear ratio.

In the fourth or highest speed gear ratio, the speed of the output shaft 20 is a maximum with respect to the lay shaft 30, and thus a maximum with respect to the input shaft 15 as well. Second through fourth speed driven gears 52–54 on output shaft 20 are progressively smaller in diameter (and thus have progressively fewer teeth) than first speed driven gear 51. In contrast, second through fourth speed driving gears 42–44 on lay shaft 30 are progressively larger in diameter (and thus progressively have a higher number of teeth) than first speed driving gear 41.

Referring now to FIGS. 1 and 2, a first coupling unit 75 is slidably disposed in the axial direction on raised portion 61c of output hub 61 between the first and second speed driven gears 51, 52. Similarly, a second coupling unit 76 is slidably disposed in the axial direction on raised portion 60c of output hub 60 between the third and fourth speed driven gears 53, 54. The first coupling unit 75 engages and is adapted to be operated by shift fork 77, and the second coupling unit 76 engages and is adapted to be operated by shift fork 78. Preferably, first and second coupling units 75, 76 are conventional clutch or dog ring units. However, it is understood that the coupling units 75, 76 may also be conventional dog and synchromesh units.

Accordingly, the first coupling unit 75 is fixed to rotate with the output shaft 20 and, as will be discussed further below, is selectively slidable in the axial direction on the output shaft 20 between a first position for releasably engaging the first speed driven gear 51 to drive the output shaft 20, a neutral position in non-engaged relation to the first and second speed driven gears 51, 52, and a second position for releasably engaging the second speed driven gear 52 to drive the output shaft 20. Similarly, the second coupling unit 76 is also fixed to rotate with the output shaft 20 and, as will also be discussed further below, is selectively slidable in the axial direction on the output shaft 20 between a first position for releasably engaging the third speed driven gear 53 to drive the output shaft 20, a neutral position in non-engaged relation to the third and fourth speed driven gears 53, 54, and a second position for releasably engaging the fourth speed driven gear 54 to drive the output shaft 20.

With reference now to FIGS. 1, 3 and 4–5, transmission 10 is provided with a shift mechanism 100 for moving shift forks 77, 78 in order to shift the transmission 10 into or out of first, second, third or fourth operational gear speeds. In accordance with the present invention, shift mechanism 100 includes a cover 110 that is adapted to enclose an opening in the top of casing 11. (Note that "shift", "shifting", and "shifter" will be used interchangeably throughout the specification). First and second pivot rods 112, 113 are rotatably supported by and extend through cover 110 so that a proximal end of each pivot rod 112, 113 projects from the top surface of the cover 110.

The distal end of first and second pivot rods 112, 113 project from the bottom surface of cover 110 into the casing 11 and are operatively connected in a conventional manner (e.g., threadedly engaged) to first and second pivot members 114, 115, respectively, so that rotation of either pivot rod 112, 113 causes the respective pivot member 114, 115 to rotate as well. Preferably, first and second pivot members 114, 115 are cylindrical in shape and are integrally connected to first and second fork holders 118, 119, respectively. First and second fork holders 118, 119 each have a bore extending at least partially therethrough for slidably receiving an upper cylindrical portion 77a, 78a of shift forks 77, 78, respectively. Accordingly, shift forks 77, 78 are operatively connected to first and second fork holders 118, 119, respectively.

The top surface 121 of a shift rail guide 120 is secured in a conventional manner to the bottom surface of cover 110 between first and second pivot members 114, 115. The shift rail guide 120 is formed with spaced apart first and second guide holes 130', 140' therethrough for slidably receiving first and second shift rails 130, 140, respectively. Preferably, the first and second guide holes 130', 140' extend through the right and left surfaces 125, 126 of the rail guide 120 and the center lines associated with the guide holes 130', 140' are parallel to one another. The distance between the facing or adjacent surfaces of the first and second guide rails 130, 140 is generally referred to as distance L.

The first and second shift rails 130, 140 may be formed in a conventional manner from solid metal rods or other suitable material. A slot 132, 142 is formed in an end portion of first and second shift levers 130, 140 for receiving first and second connecting rods 116, 117, respectively. The first and second connecting rods 116, 117 are operatively connected to, and preferably integrally formed with, the first and second pivot members 114, 115, respectively so that rotation of the first or second pivot rod 112, 113 (and thus rotation of associated pivot member 114, 115) will tend to move the corresponding first or second shift rail 130, 140 relative the shift rail guide 120.

Figure 8:
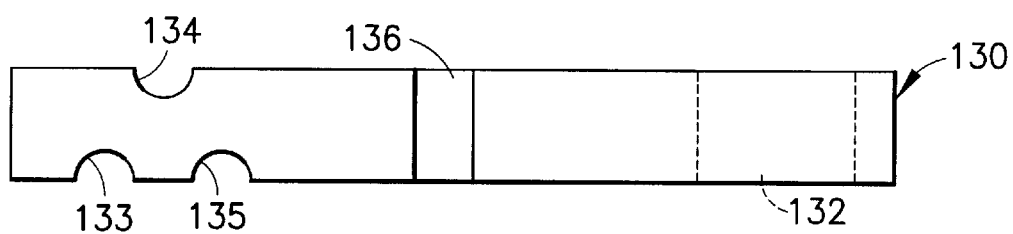
FIG. 8 is a top plan view of a shift rail for use with the shift mechanism illustrated in FIG. 4.
Figure 9:
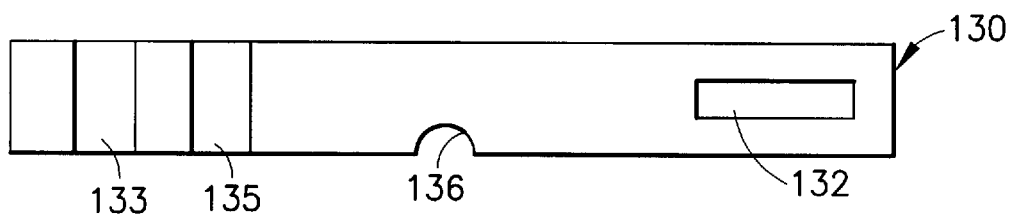
FIG. 9 is a front elevational view of the shift mechanism rail illustrated in FIG. 8.

Referring to FIGS. 8 and 9, the first and second shift rails 130, 140 are each provided with spaced apart first and second detents or tangential grooves 133, 135 or 143, 145, respectively. A neutral detent or tangential groove 134, 144 is also formed on the first and second shift rails 130, 140, respectively, between the first and second detents 133, 135 or 143, 145, but on the opposite side of first and second shift rails 130, 140 (e.g., 180° from the first and second detents).

The first and second shift rails 130, 140 also include first and second lock-out detents or tangential grooves 136, 146, respectively. The configuration of lock-out detents 136, 146 are generally the same and the depth of each lock-out detent 136, 146 is generally referred to as depth D. Lock-out detent 136 is preferably formed on the top surface of the first shift rail 130 at approximately 90° to the first and second detents 133, 135. Lock-out detent 146 is preferably formed on the bottom of the second shift rail 140 at approximately 90° to the first and second detents 143, 145.

Thus, when the first and second shift rails 130, 140 are positioned within the respective guide holes 130', 140' in shift rail guide 120, the second shift rail 140 is spaced apart from, parallel to and located above first shift rail 130. In this manner, second lock-out detent 146 formed in the bottom of the second shift rail 140 is situated above and in facing relationship with the first lock-out detent 136 formed in the top of the first shift rail 130.

Figure 7:
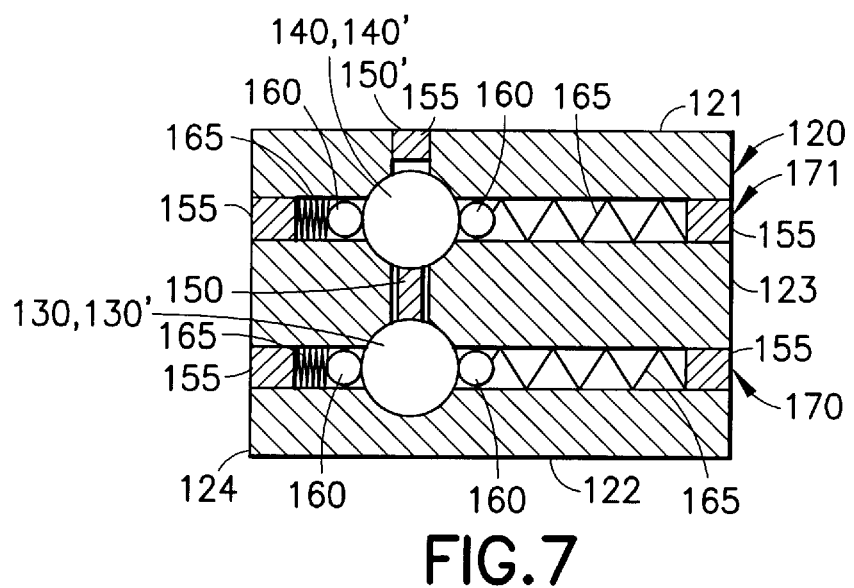
FIG. 7 is a cross sectional view of the shift mechanism housing taken along line A—A illustrated in FIG. 6.

With reference to FIG. 7, the shift rail guide 120 includes first and second holes 170, 171 that extend from the front surface 123 to the rear surface 124 through the shift rail guide 120. The first and second holes 170, 171 formed in the shift rail guide 120 extend radially through the center of the first and second rail guide openings 130', 140', respectively. The centerlines of the first and second holes 170, 171 are parallel to each other and are spaced apart a distance approximately equal to the distance between the centerlines of the first and second rail guide openings 130', 140'.

When the shift rails 130, 140 are located within the rail guide openings 130', 140' of the rail guide 120, a ball bearing 160 and compression spring (or other suitable elastomeric material) 165 is inserted into the first and second holes 170, 171 on both sides of each of the first and second shift rails 130, 140. A threaded cap 155 or other conventional member may be used to retain the ball bearing/compression spring set 160, 165 within the first and second holes 170, 171.

A ball bearing 160 is therefore forced by a compression spring 165 against opposing sides of each of the shift rails 130, 140. In this manner, when the shift rails 130, 140 are moved axially within the guide openings 130', 140' of the shift rail guide 120, the ball bearings 160 are forced against the surface of the shift rails 130, 140 and cooperate with the first, second and neutral detents 133–135 or 143–145 in the shift rails 130, 140 to accurately seat the shift rails in the appropriate positions, which will be described further below.

The shift rail guide 120 also includes a lock-out opening 150' that preferably extends at least from the top surface 121 of shift rail guide 120, through the second guide hole 140' for receiving the second shift rail 140, and into the first guide hole 130' for receiving the first shift rail 130. As illustrated in FIG. 7, the centerline of the lock-out opening 150' preferably extends perpendicular to the parallel centerlines of the first and second guide holes 130', 140' within the shift rail guide 120.

A lock-out plunger 150 is slidably received in the lock-out opening 150' formed in the shift rail guide 120 so that the plunger 150 is movable in opening 150' in the axial direction between the first and second guide holes 130', 140'. The lock-out plunger 150 may be made from a hardened steel dowel and has a diameter slightly less than that of the lock-out opening 150'. Because the lock-out plunger 150 is positioned between the first and second shift rails 130, 140, it is necessary to install the plunger 150 after the first shift rail has been positioned with the shift rail guide 120, but before the second shift rail has been installed. A threaded cap 155 or other conventional member may be used to seal or close the lock-out opening 150' proximate the top surface 121 of the shift rail guide 120 after the lock-out plunger 150 is installed within the opening 150'.

Figure 10:
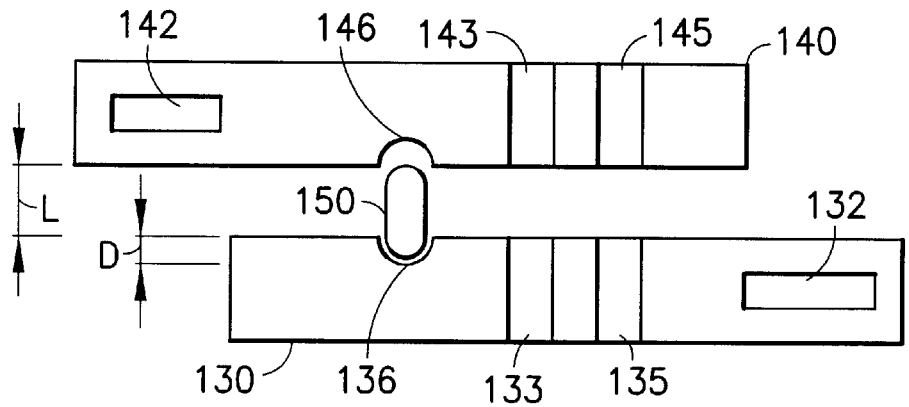
FIG. 10 is a front elevational view of corresponding shift mechanism rails in the neutral position.

With reference to FIG. 10, the length (L+D) of the lock-out plunger 150 is slightly less than the combined distance L between the bottom of the second rail 140 and the top of the first rail 130, and the depth D of lock-out detent 136 or 146. In this manner, when the first and second lock-out detents 136, 146 are aligned in facing relationship with one another, a portion of lock-out plunger 150 is always located in one of the lock-out detents 136 or 146 to impede axial movement of the corresponding shift rail 130 or 140, but not in the opposing detent 136 or 146. The ends of the lock-out plunger 150 are suitably curved or otherwise configured to correspond to the configuration of lock-out detents 136, 146 so that the plunger 150 can be guided in and out of lock-out detent 136 or 146 when one of the shift rails 130 or 140 is moved axially within the guide block 120. As such, lock-out plunger 150 may effectively preclude axial movement of one of the shift rails 130, 140 without impeding axial movement of the other.

The operation of the shift mechanism 100 and transmission 10 in accordance with the present invention is explained below. An operator of the motor vehicle is capable of changing gears within transmission 10 by a shift lever or gear shift (not shown) that is located within the driver's compartment of the automobile. The shift lever is operatively connected in a conventional manner to first and second pivot rods 112, 113 so that appropriate movement of the shift lever in a predefined pattern causes one of the pivot rods 112 or 113 to rotate with respect to the shift mechanism cover 110.

Figure 12:
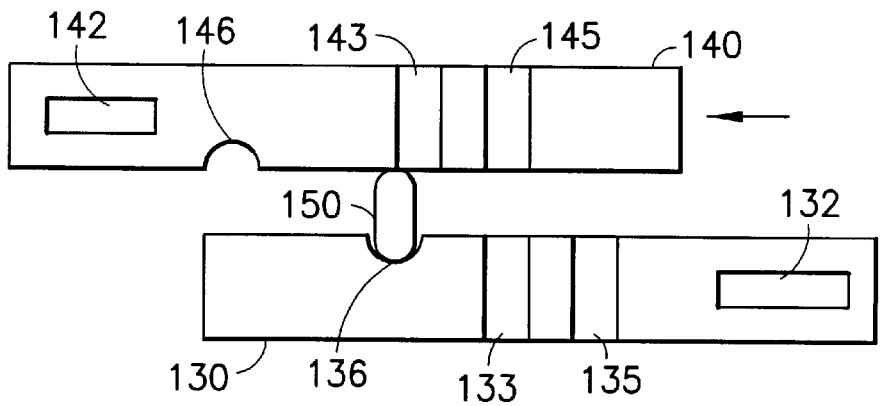
FIG. 12 is a front elevational view of corresponding shift mechanism rails in first or second speed operation.

For example, movement of the shift lever by the operator to a position corresponding to first speed operation of transmission 10 causes pivot rod 112 to rotate with respect to cover 110. Such rotation of pivot rod 112 causes first pivot rod member 114, first connecting rod 116 and first fork holder 118 to turn as well. Movement of the first connecting rod 116 in turn causes the second shift rail 140 to slide axially within the shift rail guide 120. With reference to FIG. 12, axial movement of second shift rail 140 causes the lock-out plunger 150 to seat itself within the lock-out detent 136 of the first shift rail 130, thereby preventing shift rail 130 from moving axially out of the neutral position until such time as the second shift rail 140 returns to the neutral position.

The second shift rail 140 continues to move axially until the spring loaded ball bearing 160 seats itself in the first detent 143. The distance traveled by the shift rail 140 between the neutral detent 144 and first detent 143 corresponds to the amount of rotation of the first fork holder 118 and attached first fork holder 77 necessary to move the first clutch ring 75 into engagement with the first dog teeth 71 of the first driven gear 51. Because the first clutch ring 75 is in splined engagement and continuously rotates with respect to output shaft 20, engagement of the first clutch ring 75 with the first dog teeth 71 couples the first driven gear 51 to output shaft 20. Accordingly, input torque from the internal combustion engine (not shown) is transmitted through the input shaft 15 to the lay shaft 30 through the engagement of the input gear 18 with the reduction gear 40, which, in turn, transmits torque through the lay shaft 30 to the output shaft 20 through the engagement of the first speed drive gear 41 with the first speed driven gear 51.

Similarly, if the shift lever (not shown) is positioned to select second speed operation of the transmission 10, pivot rod 112 is rotated in a direction opposite to that with respect to first speed operation. Such rotation of pivot rod 112 again causes first pivot rod member 114, first connecting rod 116 and first fork holder 118 to turn, which in turn causes second shift rail 140 to slide axially within the shift rail guide 120 past the neutral position until the ball bearing 160 seats itself within the second detent 145. Referring again to FIG. 12, axial movement of second shift rail 140 causes the lock-out plunger 150 to seat itself within the lock-out detent 136 of the first shift rail 130, thereby preventing shift rail 130 from moving axially out of the neutral position until such time as the second shift rail 140 returns to the neutral position.

As mentioned above, the second shift rail 140 continues to move axially until the spring loaded ball bearing 160 seats itself in the second detent 145. The distance traveled by the shift rail 140 between the neutral detent 144 and second detent 145 corresponds to the amount of rotation of the first fork holder 118 and attached first fork holder 77 necessary to move the first clutch ring 75 into engagement with the second dog teeth 72 of the second driven gear 52 from the neutral position. Because the first clutch ring 75 is in splined engagement and continuously rotates with respect to output shaft 20, engagement of the first clutch ring 75 with the second dog teeth 72 couples the second driven gear 52 to output shaft 20. Accordingly, input torque from the internal combustion engine (not shown) is transmitted through the input shaft 15 to the lay shaft 30 through the engagement of the input gear 18 with the reduction gear 40, which, in turn, transmits torque through the lay shaft 30 to the output shaft 20 through the engagement of the second speed drive gear 42 with the second speed driven gear 52.

Furthermore, upon appropriate positioning of the shift lever (not shown) to select third speed operation of the transmission 10, pivot rod 112 is rotated back to its original position, thereby causing the second shift rail 140 to move back to the neutral position within the shift rail guide 120. In this neutral position as illustrated in FIG. 10, spring-loaded ball bearing 160 is seated in neutral detent 144 and the first and second lock-out detents 136, 146 of shift rails 130, 140 are directly aligned in facing relationship with one another.

Figure 11:
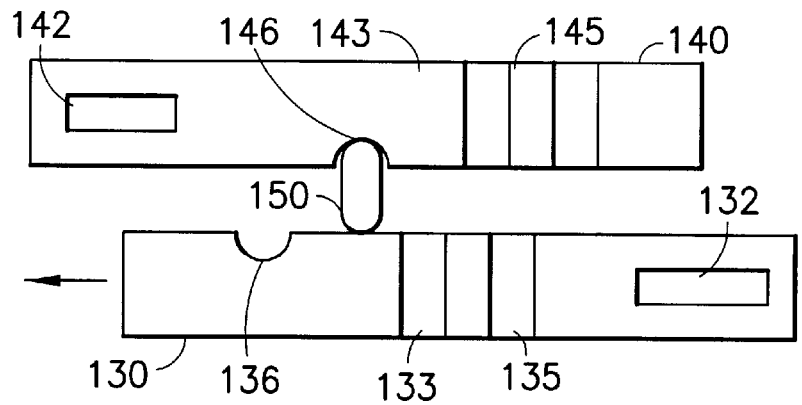
FIG. 11 is a front elevational view of corresponding shift mechanism rails in third or fourth speed operation.

Positioning of the shift lever for third speed operation further causes pivot rod 113 to rotate, which causes second pivot rod member 115, second connecting rod 117 and second fork holder 119 to turn, which, in turn, causes first shift rail 130 to slide axially within the shift rail guide 120 out of neutral position until the spring-loaded ball bearing 160 seats itself within the first detent 133. Referring to FIG. 11, axial movement of first shift rail 130 causes the lock-out plunger 150 to move axially out of detent 136 and to seat itself within the lock-out detent 146 of the second shift rail 140, thereby preventing shift rail 140 from moving axially out of the neutral position until such time as the first shift rail 130 returns to the neutral position.

As mentioned above, in third speed operation, the first shift rail 130 continues to move axially until the spring-loaded ball bearing 160 seats itself in the first detent 133. The distance traveled by the shift rail 130 between the neutral detent 134 and first detent 133 corresponds to the amount of rotation of the second fork holder 119 (and attached second shift fork 78) necessary to move the second clutch ring 76 into engagement with the third dog teeth 73 of the third driven gear 53. Because the second clutch ring 76 is in splined engagement and continuously rotates with respect to output shaft 20, engagement of the second clutch ring 76 with the third dog teeth 73 couples the third driven gear 53 to output shaft 20. Accordingly, input torque from the internal combustion engine (not shown) is transmitted through the input shaft 15 to the lay shaft 30 through the engagement of the input gear 18 with the reduction gear 40, which, in turn, transmits torque through the lay shaft 30 to the output shaft 20 through the engagement of the third speed drive gear 43 with the third speed driven gear 53.

Finally, upon appropriate positioning of the shift lever (not shown) to select fourth speed operation of the transmission 10, pivot rod 113 is caused to rotate in a direction opposite that with respect to third gear. Such rotation of pivot rod 113 again causes second pivot rod member 115, second connecting rod 117 and second fork holder 119 to turn, which, in turn, causes first shift rail 130 to slide axially within the shift rail guide 120 past the neutral position until the spring-loaded ball bearing 160 seats itself within the second detent 135. Again referring to FIG. 11, axial movement of first shift rail 130 causes the lock-out plunger 150 to move axially out of detent 136 and to seat itself within the lock-out detent 146 of the second shift rail 140, thereby preventing shift rail 140 from moving axially out of the neutral position until such time as the first shift rail 130 returns to the neutral position.

As mentioned above, in fourth speed operation, the first shift rail 130 continues to move axially until the spring-loaded ball bearing 160 seats itself in the second detent 135. The distance traveled by the shift rail 130 between the neutral detent 133 and second detent 135 corresponds to the amount of rotation of the second fork holder 119 (and attached second shift fork 78) necessary to move the second clutch ring 76 into engagement with the fourth dog teeth 74 of the fourth driven gear 54 from the neutral position. Because the second clutch ring 76 is in splined engagement and continuously rotates with sect to output shaft 20, engagement of the second clutch ring 76 with the fourth dog teeth 74 couples the fourth driven gear 54 to output shaft 20.

Accordingly, input torque from the internal combustion engine (not shown) is transmitted through the input shaft 15 to the lay shaft 30 through the engagement of the input gear 18 with the reduction gear 40, which, in turn, transmits torque through the lay shaft 30 to the output shaft 20 through the engagement of the fourth speed drive gear 44 with the fourth speed driven gear 54.

Figure 13A:
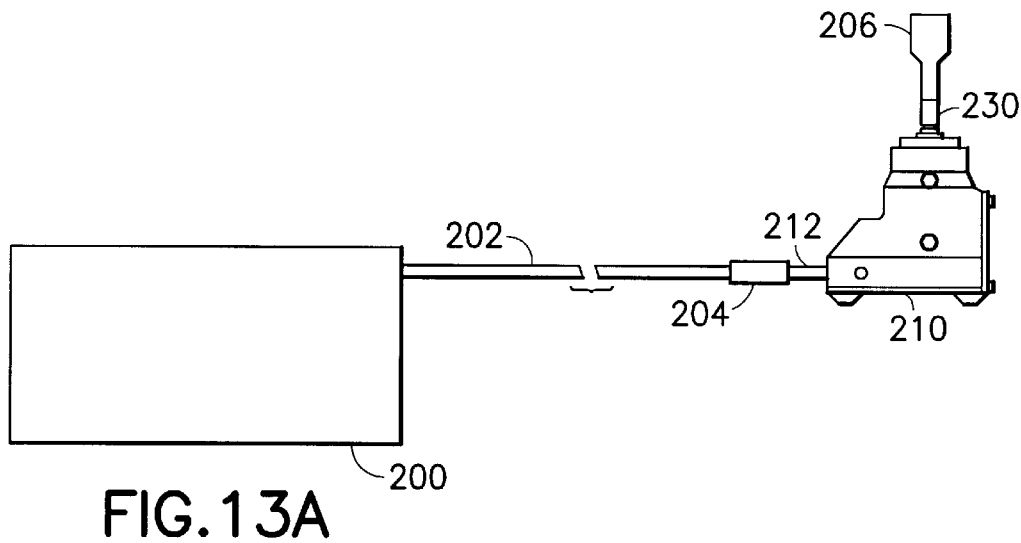
FIG. 13A is a side elevational view of an externally mounted transmission shift mechanism connected to a transmission.
Figure 13B:
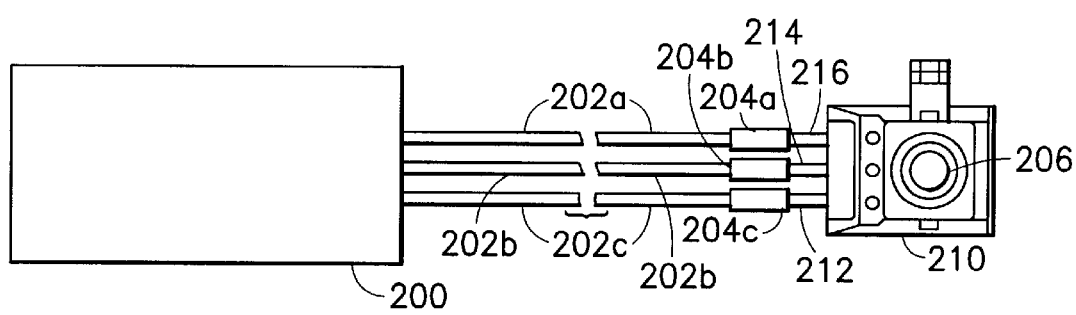
FIG. 13B is a top plan view of the externally mounted transmission shift mechanism connected to a transmission as illustrated in FIG. 13A.

FIGS. 13A and 13B illustrate another embodiment of the present invention. FIG. 13A is a side elevational view of a transmission 200 coupled through selector rod 202 to shift rail 212 housed in an externally mounted transmission shifting mechanism 210. The selector rod 202 is broken to illustrate that the external shift mechanism 210 may be mounted in a variety of positions with respect to the transmission in the vehicle. For example, the external shift mechanism may be mounted forward, behind, to the side of, or on top of the transmission 200. FIG. 13A also shows shifting rod 206 which is used by the operator of the vehicle to change gears and is connected to gear lever 230.

FIG. 13B is a top plan view of the transmission 200 operatively coupled to selector rods 202a, 202b, and 202c. Selector rods 202a, 202b, and 202c are coupled to connectors 204a, 204b, and 204c which are coupled to shift rails 212, 214, and 216 housed in the external shifting mechanism 210.

Figure 14:
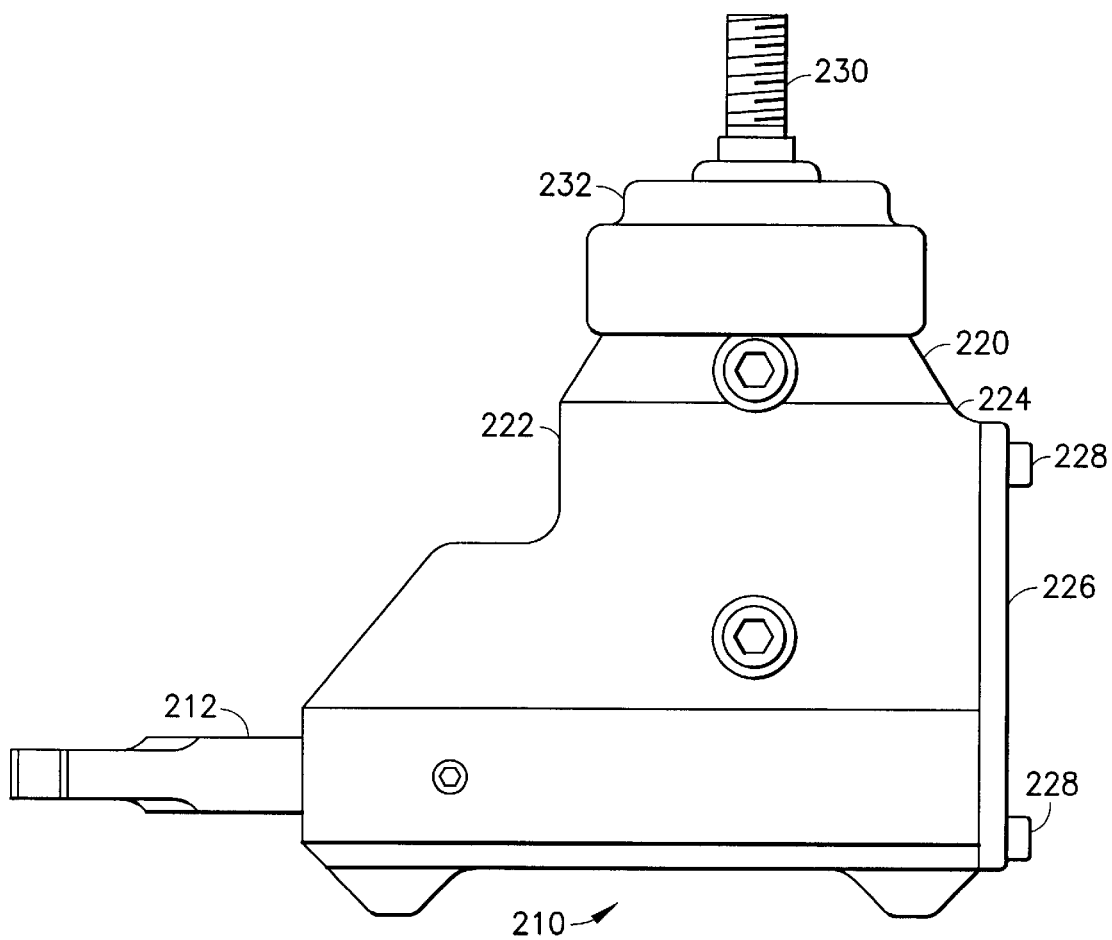
FIG. 14 is a side elevational view of the externally mounted transmission shift mechanism illustrated in FIG. 13A.
Figure 15:
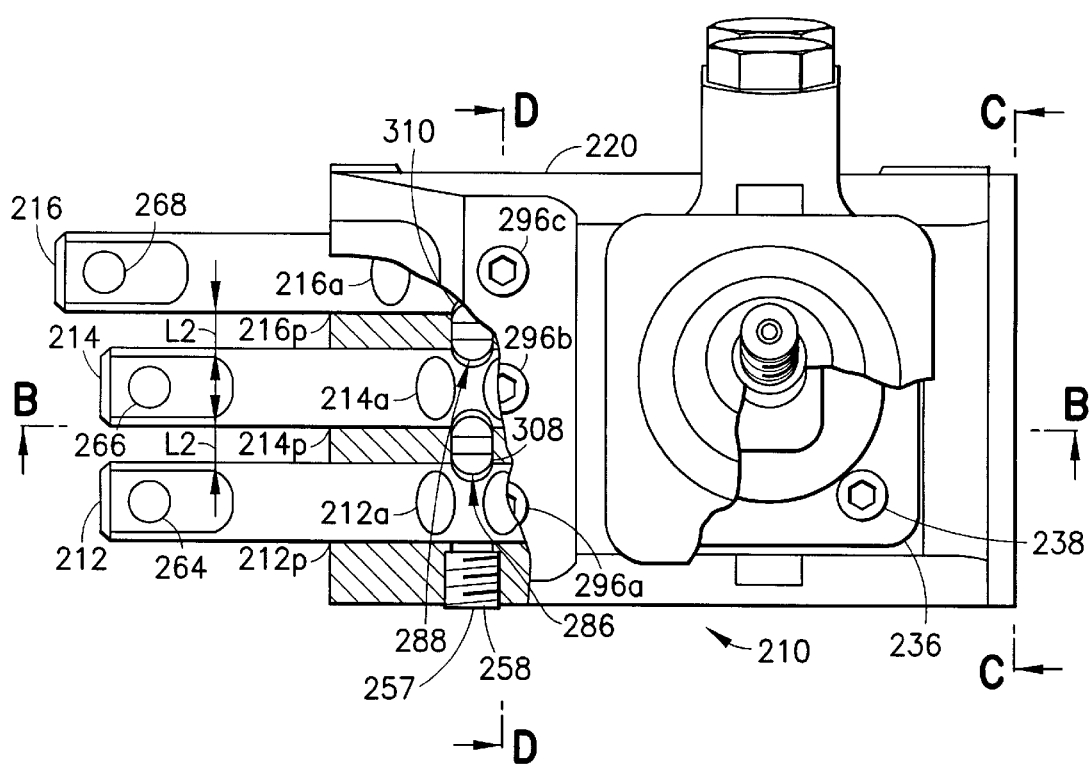
FIG. 15 is a top plan view of the externally mounted transmission shift mechanism illustrated in FIG. 14.
Figure 16:
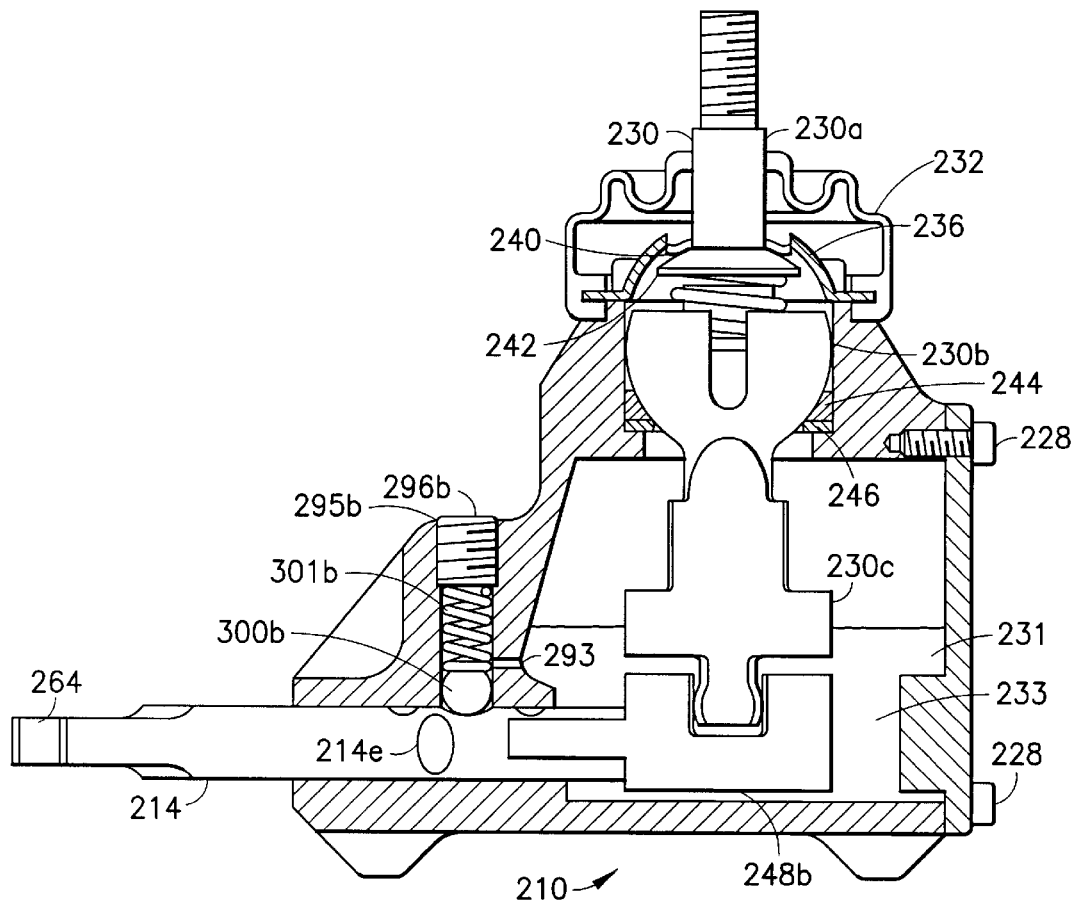
FIG. 16 is a side cross-sectional view of the externally mounted transmission shift mechanism taken along line B—B in FIG. 15.
Figure 17:
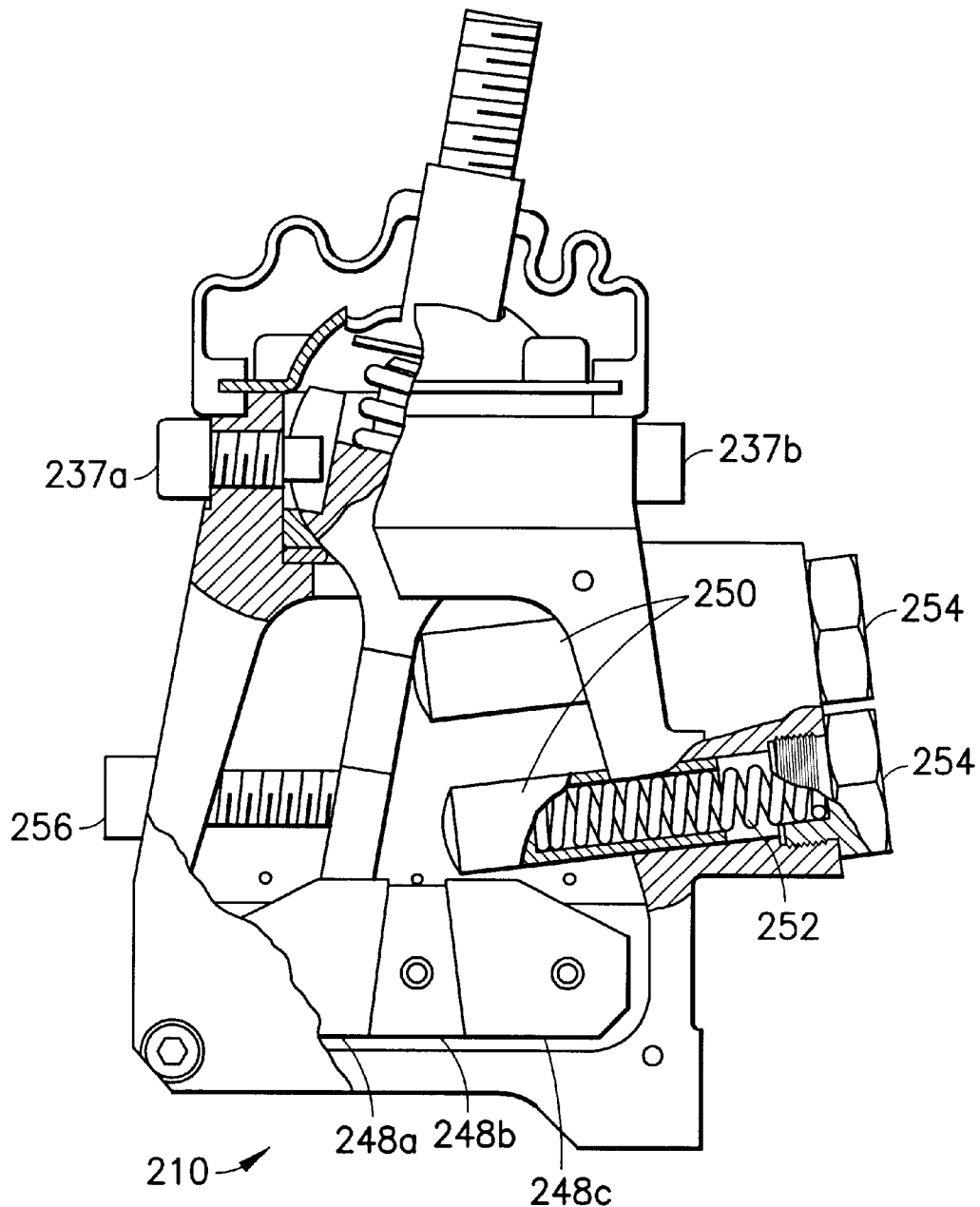
FIG. 17 is a broken open rear view of the externally mounted transmission shift mechanism showing element structure and cross sections taken along line C—C in FIG. 15.
Figure 18A:
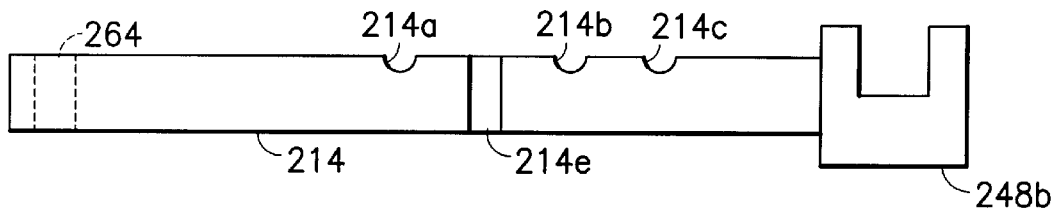
FIG. 18A is a side elevational view of a shift rail for use with the externally mounted transmission shift mechanism illustrated in FIG. 15.
Figure 18B:
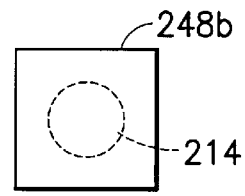
FIG. 18B is a rear elevational view of a shift rail for use with the externally mounted transmission shift mechanism illustrated in FIG. 15.
Figure 18C:
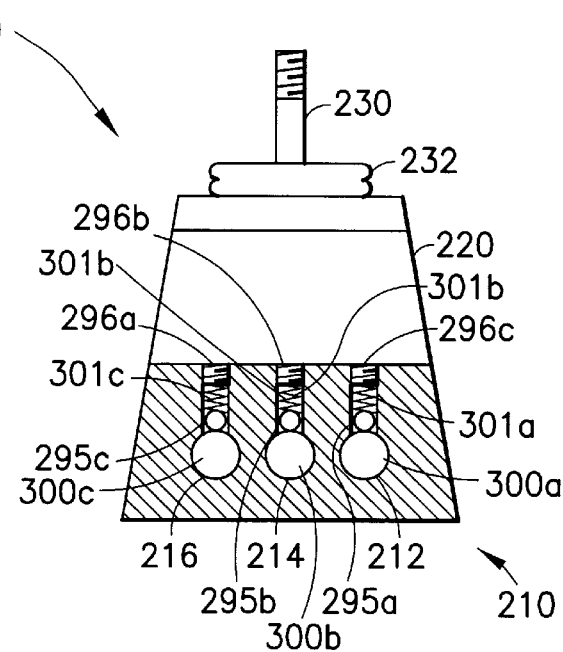
FIG. 18C is a front cross-sectional view of the externally mounted transmission shift mechanism taken along line D—D in FIG. 15.

The external shifting mechanism 210 structure will be described with reference to FIGS. 14, 15, 16, 17, and 18A–18C. FIG. 14 is a side elevational view of the externally mounted transmission shift mechanism illustrated in FIG. 13A. FIG. 15 is a top plan view of the externally mounted transmission shift mechanism illustrated in FIG. 14. FIG. 16 is a side cross-sectional view of the externally mounted transmission shift mechanism taken along line B—B in FIG. 15. FIG. 17 is a broken open rear view of the externally mounted transmission shift mechanism showing element structure and cross sections taken along line C—C in FIG. 15. FIG. 18A is a side elevational view of a shift rail for use with the externally mounted transmission shift mechanism illustrated in FIG. 15. FIG. 18B is a rear elevational view of a shift rail for use with the externally mounted transmission shift mechanism illustrated in FIG. 15. FIG. 18C is a front cross-sectional view of the externally mounted transmission shift mechanism taken along line D—D in FIG. 15.

FIG. 14 illustrates that the externally mounted shifting mechanism 210 includes a casing or housing structure 220 (which may be a casted structure) having a front face 222 and a rear face 224. A rear cover 226 may be attached through a plurality of rear cover screws 228 to the rear face 224 of the shifting mechanism housing structure 220.

The gear lever 230 may be attached to a shifting rod 206 (as illustrated in FIG. 13A) through gear lever threads 232. The gear lever 230 is received within and rotatably supported relative to the casing 220. As discussed above, the gear lever 230 is shifted by the operator of a vehicle to change an operating gear of the vehicle. The connection of the lower gear lever 230 to the housing is protected by a rubber boot or grommet 232 which helps to protect the inside of the casing from environmental hazards such as exhaust, moisture, etc. As shown in FIG. 16, the gear lever 230 may be one continuous piece made up of an upper portion 230a, middle portion 230h, and a lower portion 230c.

FIG. 15 illustrates an outer cover 236 and outer cover screws 238 which function in part to also help protect the interior of the casing 220 from environmental hazards. FIG. 16 shows an inner plate 240 which is press fit against the outer cover 236 by elastic structure or spring 242. The middle portion of the gear lever 230b is preferably half of a spherical shape so that it might be leveraged against the seat 244 which rests on a spacer 246. Spacer 246 may be a durable material such as plastic or nylon. The spacer 246 provides an even seat for the middle portion of the gear lever 230c which assists in allowing for precision shifting. Pivot screws 237a and 237b (illustrated in FIG. 17) may be used to help maintain the middle portion of the gear lever 230b in proper alignment. The lower portion of the gear lever 230c operatively interlocks one at a time with each of the rail engagement ends 248a, 248b, and 248c. The rail engagement ends 248a, 248b, and 248c are operatively coupled to each of the corresponding shift rails 212a, 212b, and 212c. Applying force to the lower portion of the gear lever 230c are plungers 250. The plungers 250 are made up of elastic members or springs 252 which are pre-adjusted by tightening plugs 254. The plungers 250 may work in conjunction with stop 256 to maintain a constant pressure on the gear lever 230 to control movement of the gear lever 230.

The thee shift rails 212, 214, and 216 allow the external shifting mechanism 210 to control a first, second, third, fourth, and reverse gears. Shift rail 212 controls third and fourth gear operation, shift rail 214 controls first and second gear operation, and shift rail 216 controls reverse gear operation. (The gear operation order of these shift rails may be changed depending on the particular application). As shown in FIG. 15, the distal ends of the shift rails 212, 214, and 216 project from the housing 220 and are operatively connected to the selector levers 202a, 202b, and 202c through connectors 204a, 204b, and 204c in a conventional manner (e.g., threadedly engaged) through bosses or holes 264, 266, and 268 so that movement in any of the shift rails 212, 214, and 216 causes the respective selector lever 202a, 202b, or 202c to move as well and the result in a gear change in the transmission 200. Preferably, the shift rails 212, 214, and 216 are cylindrical in shape and may be formed in a conventional manner from solid metal rods or other suitable materials. The distances between the facing or adjacent surfaces of the shift rails is generally referred to as L2 as shown in FIG. 15.

Referring to FIGS. 16, 18A, 18C, and 19A, the top surface of each of the shift rails 212, 214, and 216 contain spaced apart detents or tangential grooves 212a–c, 214a–c, and 216a–c, respectively. Detents 212a, 212b, and 212c are the first detents and these detents in combination with the ball bearings 300a, 300b, and 300c secure one of the shift rails 212, 214, and 216 when it is in a "forward" position (the term forward corresponding to the front face of the external shifter 222 and as designated in FIGS. 19A–19E). Detents 212b, 214b, and 216b are the neutral detents and these detents in combination with ball bearings 300a, 300b, and 300c secure the shift rails 212, 214, and 216 when the shift rails are in a neutral position. Detents 212c, 214c, and 216c are the second detents and these detents in combination with ball bearings 300a, 300b, and 300c secure one of the shift rails 212, 214, and 216 when it is in a "rearward" position (the term "rearward" corresponding to the front face of the external shifter 222 and as designated in FIGS. 19A–19E).

Figure 19A:
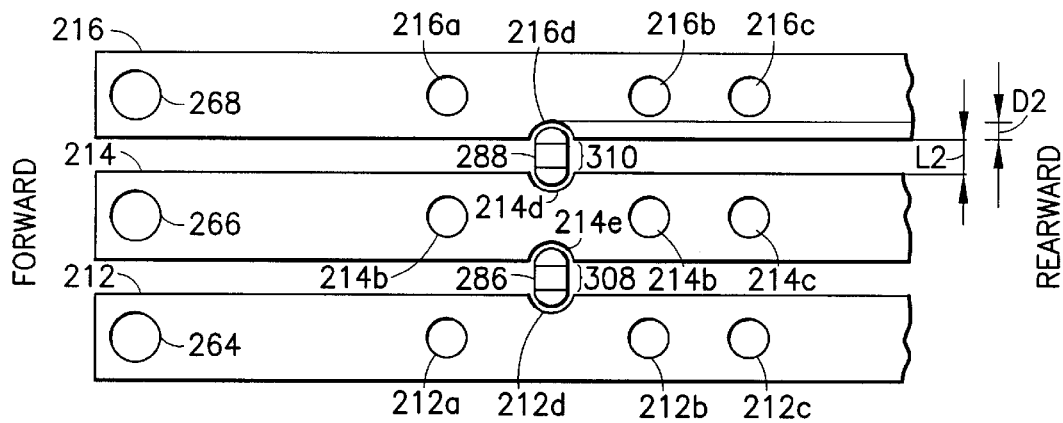
FIG. 19A is a top view of corresponding externally mounted transmission shift mechanism rails in neutral.

The shift rails 212, 214, and 216 also contain lock-out detents 212d, 214d, 214e, and 216d. The configuration of the lock-out detents 212d, 214d, 214e, and 216d is generally the same and the depth of each lock-out detent is generally referred to as D2 as shown in FIG. 19A. FIG. 19 shows the lock-out detent 212d is formed on the side surface of shift rail 212 at approximately 90° to the detents 212a–212c.

Lockout detents 214d and 214e are formed on both side surfaces of the second shift rail 214 at approximately 90° to the detents 214a–214c. Lock-out detent 216d is formed on the side surface of shift rail 216 at approximately 90° to the detents 216a–216c.

As discussed above, each of the detents or tangential grooves 212a–c, 214a–c, and 216a–c interact with detent ball bearings 300a–300c, compression springs (or other suitable elastomeric member) 301a–c, and threaded caps 296a–c located in ball bearing chambers 295a–c to lock the shift rails 212, 214, and 216 into place. As discussed above, FIG. 16 is a side cross-sectional view of the externally mounted transmission shift mechanism taken along line B—B in FIG. 15. FIG. 16 shows ball bearing chamber 295b including a detent ball 300b, spring 301b, and threaded cap 296b. (Detent balls 300a and 300c, elastic members 301a and 301c, and threaded caps 296a and 296c are similar in structure to detent ball 300b, elastic member 300b, and threaded cap 296b and are shown in their respective ball bearing chambers 295a and 295c in FIG. 18C). The detent ball bearing 300b is therefore forced by compression spring 301b against the top surface of shift rail 214. In this manner, when the shift rails 212, 214, and 216 are moved axially within shift rail passages 212p, 214p, and 216p (as shown in FIG. 15), respectively, the detent ball bearings 300a–300c are forced against the top surfaces of the shift rails 212, 214, and 216 into the detents 212a–c, 214a–c and 216a–c. Positions 212a, 214a, and 216a being the first detent positions, positions 212b, 214b, and 216b being the neutral detent positions, and positions 212c, 214c, and 216c being the second detent positions. The detents 212a–c, 214a–c and 216a–c cooperate with lock-out detents 212d, 214d, 214e, and 216d to accurately seat the shift rails 212, 214, and 216 in the appropriate positions, which will be described further below.

Lock-out plungers or interlocking slugs 286, 288 (as shown in FIGS. 15 and 19A) are slidably received in the lock-out openings 308, 310 formed by detents 212d and 214e and detents 214d and 216d, respectively. Therefore, plunger 288 is movable in the opening 310 between shift rail passages 212p, 214p and the plunger 288 is movable in the opening 310 between shift rail passages 214p, 216p. The plungers 286, 288 may be machined from a hardened steel dowel to form precision pieces and each has a diameter slightly less than that of each of the lock-out openings 308, 310. Because the lock-out plungers 286, 288 are positioned between the shift rails 212, 214, and 216, a preferred assembly method is to install the shift rail 216 first, then the lock-out plunger 288, then the shift rail 214, then the lock-out plunger 286, and finally the shift rail 212. Interlock screw 257 or other conventional member may be used to seal or close the opening 258 after the lock-out plungers 286 and 288 are installed.

FIG. 18A is a side view of a shift rail 214 attached to a rail engagement end 248b for use with the external shifting mechanism illustrated in FIG. 14. FIG. 18B is an axial view of shift rail 214 attached to the rail engagement end 248b for use with the external shifting mechanism illustrated in FIG. 14.

Figure 19B:
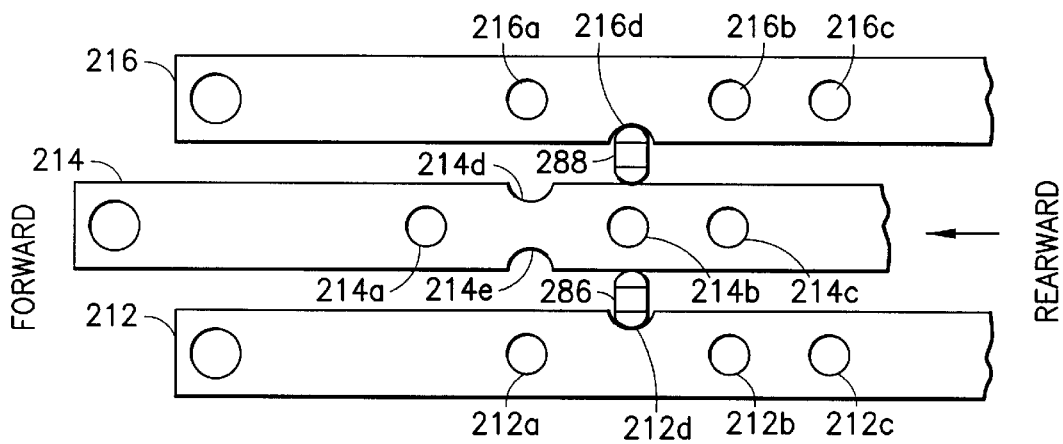
FIG. 19B is a top view of corresponding externally mounted transmission shift mechanism rails in first or second speed operation.
Figure 19C:
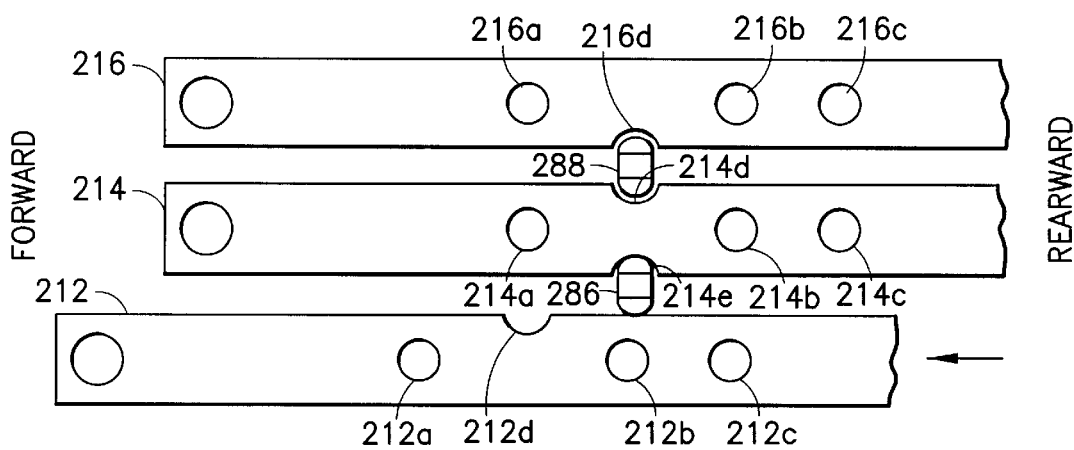
FIG. 19C is a top view of corresponding externally mounted transmission shift mechanism rails in third or fourth speed operation.

As previously discussed, FIG. 19A is a front elevational view of shift rails 212, 214, and 216 in the neutral position. The length (L2+D2) of each of the lock-out plungers 286, 288 is slightly less than the combined distance L2 between the shift rails and the depth D2 of the lock-out detents. In this manner, when opposing lock-out detent pairs 212d, 214e and 214d, 216d are aligned in facing relationship with one another, a portion of each of the lock-out plungers 286, 288 is always located in one of the lock-out detents 212d, 214e or 214d, 216d to impede axial movement of two of the three shift rails 212, 214, or 216 depending on the gear chosen by the operator. When shift rail 214 is moved out of the neutral position (as illustrated in FIG. 19B), lock-out plunger 286 will be pressed into a first lock-out position in detent 212d. When shift rail 212 is moved out of the neutral position (as illustrated in FIG. 19C), lock-out plunger 286 will be pressed into a second lock-out position in detent 214e. When shift rail 216 is moved out of the neutral position (as illustrated in FIG. 19B), lock-out plunger 288 will be moved into a third lock-out position in detent 214d. Also, when shift rail 214 is moved out of the neutral position, lock-out plunger 288 will be moved into a fourth lock-out position in detent 216d. The ends of the lock-out plungers 286, 288 are suitably curved or otherwise configured to correspond to the configuration of lock-out detents 212d, 214e, 214d, and 216d so that the plungers 286, 288 may be guided in and out of lock-out detents 212d, 214e, 214d, and 216d when one of the shift rails 212, 214, or 216 is moved axially. As such, the lock-out plungers 286, 288 may effectively preclude axial movement of two of the shift rails 212, 214, or 216 without impeding axial movement of the third shift rail.

The operation of the shift mechanism 210 in accordance with the embodiment shown in FIGS. 13A–19E is discussed below. As previously explained, an operator of the vehicle is capable of changing gears within transmission 200 by a shift lever or gear shift 206 which is located within the operator's compartment. The shift lever is operatively connected to gear lever 230 and appropriate movement of the shift lever 206 in a predefined manner causes the movement of gear lever 230 and corresponding movement of the shift rails 212, 214, and 216. The movement of the shift rails 212, 214, and 216 causes movement in the attached selector rods 202a, 202b, and 202c which allows for shifting between first, second, third, fourth, and reverse gears in transmission 200. Shift rail 214 moves between first gear when it is in the rearward position and second gear when it is in the forward position, shift rail 212 moves between third gear when it is in the rearward position and fourth gear when it is in the forward position, and shift rail 216 moves into the forward position when it is in the reverse gear.

For example, movement of the gear lever 230 by the operator to a position corresponding to second speed operation of transmission 200 causes the lower portion of the gear lever 230c to slide into rail engagement end 248b and drive shift rail 214 to slide axially within the passage 214p as shown in FIG. 19B. Axial movement of shift rail 214 causes lock-out plunger 288 to seat itself within lock-out detent 216d (the fourth lock-out position) of shift tail 216, thereby preventing shift rail 216 from moving axially out of the neutral position until such time as shift rail 214 returns to the neutral position. Similarly, axial movement of shift rail 214 causes lock-out plunger 286 to seat itself within lock-out detent 212d (first lock-out position) of shift rail 212, thereby preventing shift rail 212 from moving axially out of the neutral position until such time as shift rail 214 returns to the neutral position. Shift rail 214 continues to move axially until the detent bearing ball 300b seats itself in detent 214c. The distance traveled by the shift rail 214 in the forward direction corresponds to the distance between the neutral detent 214b and detent 214c and is enough to shift the gears of the transmission 200 into second gear.

Furthermore, upon appropriate positioning of the gear level 230 to select a neutral gear as shown in FIG. 19A, lower portion of the gear lever 230c moves rail engagement end 248b and, therefore, also shift rail 214 back to a neutral position. In this neutral position, detent ball bearing 300b is seated in neutral detent 214b and the lock-out detents 212d, 214e, 214d, and 216d are all directly aligned in facing relationship with one another.

Positioning of the gear lever 230 to select the fourth gear of operation of the transmission 200 is shown in FIG. 19C which illustrates the positioning of the shift rails 212, 214, and 216. Lower portion of the gear lever 230c is moved into the rail engagement end 248a of shift rail 212 which in turn causes shift rail 212 to slide axially past the neutral position until the detent ball bearing 300a seats itself in detent 212c. Axial movement of shift rail 212 causes lock-out plunger 286 to seat itself within lock-out detent 214e (second lock-out position) of shift rail 214, thereby preventing shift rail 214 from moving axially out of the neutral position until such time as shift rail 212 returns to the neutral position. At the same time, shift rail 216 does not move in the axial direction because lock-out plunger 288 which is seated between lock-out detents 214d and 216d prevents movement of shift rail 216 out of the neutral position until such time as shift rail 212 returns to the neutral position. Shift rails 214 and 216 are also held in position by ball bearings 300b and 300c which lock into detents 214b and 216b.

As mentioned above, shift rail 212 continues to move axially until the detent bearing ball 300a seats itself in detent 212c. The distance traveled by the shift rail 212 corresponds to the distance between the neutral detent 212b and detent 212c and is enough to shift the gears of the transmission 200 into fourth gear.

Figure 19D:
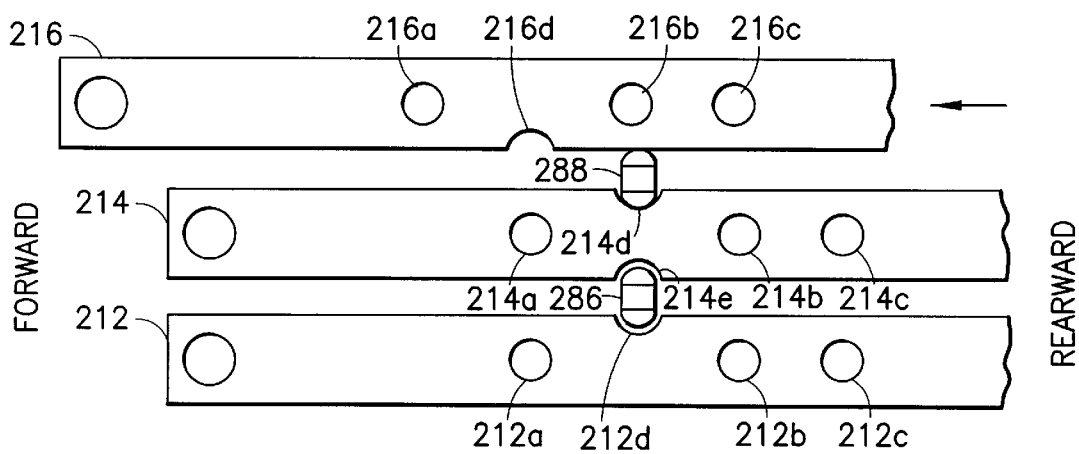
FIG. 19D is a top view of corresponding externally mounted transmission shift mechanism rails in reverse operation.

Furthermore, upon appropriate positioning of the gear level 230 to select a reverse operation as shown in FIG. 19D from the neutral position as shown in FIG. 19A, the lower portion of the gear lever 230c moves rail engagement end 248c and, therefore, also shift rail 216. The lower portion of the gear lever 230c moves rail engagement end 248c and shift rail 216 in the axial direction. Shift rail 216 slides axially from the neutral position until the detent ball bearing 300c seats itself in detent 216c. Axial movement of shift rail 216 causes lock-out plunger 288 to seat itself within lock-out detent 214d (third lock-out position) of shift rail 214, thereby preventing shift rail 214 from moving axially out of the neutral position until such time as shift rail 216 returns to the neutral position. At the same time, shift rail 212 does not move in the axial direction because lock-out plunger 286 which is seated between lock-out detents 212d and 214e prevents movement of shift rail 212 out of the neutral position until such time as shift rail 216 returns to the neutral position. Shift rails 212 and 214 are also held in position by the ball bearings 300a and 300b which lock into neutral detents 212b and 214b, respectively.

Figure 19E:
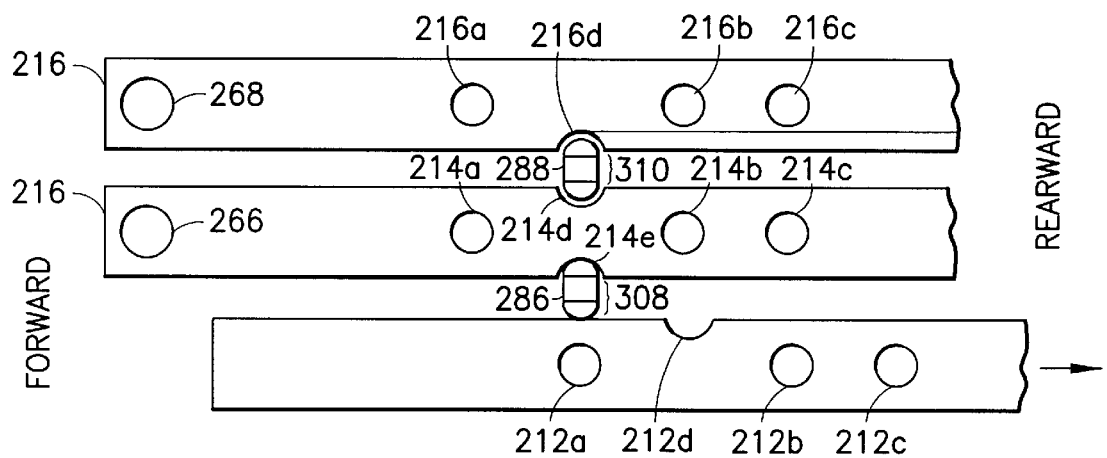
FIG. 19E is a top view of corresponding externally mounted transmission shift mechanism rails in third or fourth speed operation.

Furthermore, upon appropriate positioning of the gear level 230 to select a third speed operation as shown in FIG. 19E, the lower portion of the gear lever 230c moves rail engagement end 248a in an axial direction along with shift rail 212, in the rearward direction. Shift rail 212 slides axially from the neutral position until the detent ball bearing 300a seats itself in detent 212a. Axial movement of shift rail 212 causes lock-out plunger 286 to seat itself within lock-out detent 214e (second lock-out position) of shift rail 214, thereby preventing shift rail 214 from moving axially out of the neutral position until such time as shift rail 212 returns to the neutral position. At the same time, shift rail 216 does not move in the axial direction because lock-out plunger 288 which is seated between lock-out detents 214d and 216d prevents movement of shift rail 216 out of the neutral position until such time as shift rail 212 returns to the neutral position. Shift rails 214 and 216 are also held in position by the ball bearings 300b and 300c which lock into neutral detents 214b and 216b, respectively.

Although the positions of shift rails 212, 214, and 216 have not been shown for first gear operation, they may be adjusted in a manner similar to the above descriptions of the second, third, fourth, and reverse gear operations.

FIGS. 20–24F illustrate the structure and operation of another embodiment of the present invention. Instead of having three shift rails as shown in FIGS. 13–19E, an alternative embodiment would have four shift rails 312, 314, 316, and 318. This will allow the shifter to operate first, second, third, fourth, fifth, sixth, and reverse gears.

Figure 20:
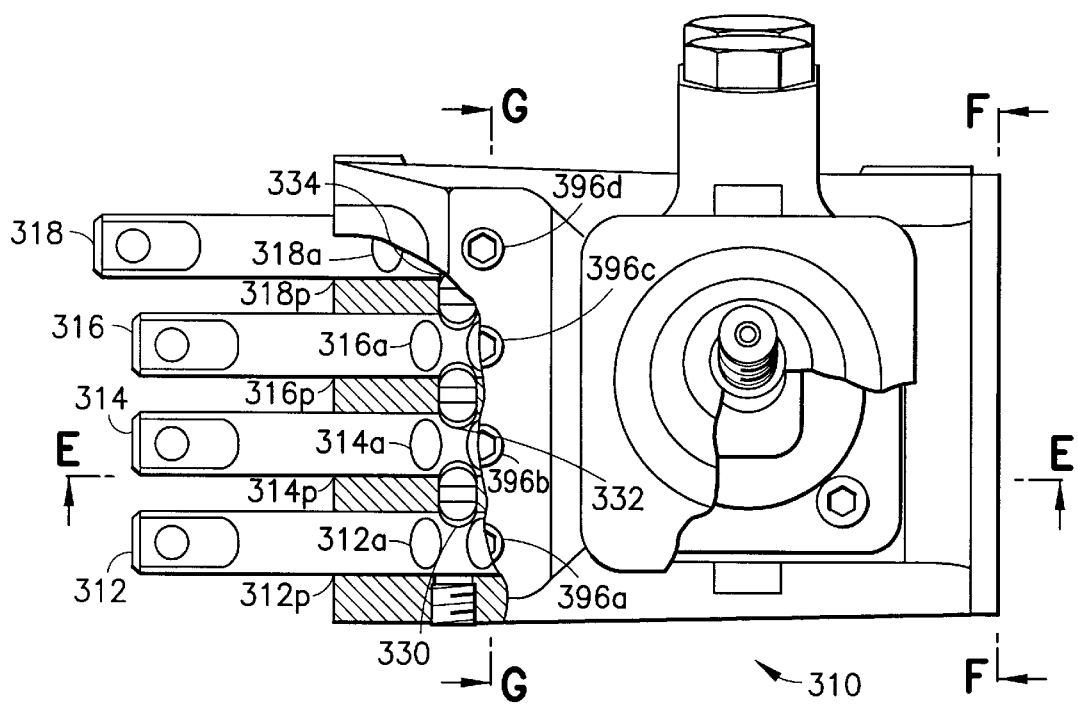
FIG. 20 is a top plan view of the externally mounted transmission shift mechanism with four shift rails.
Figure 21:
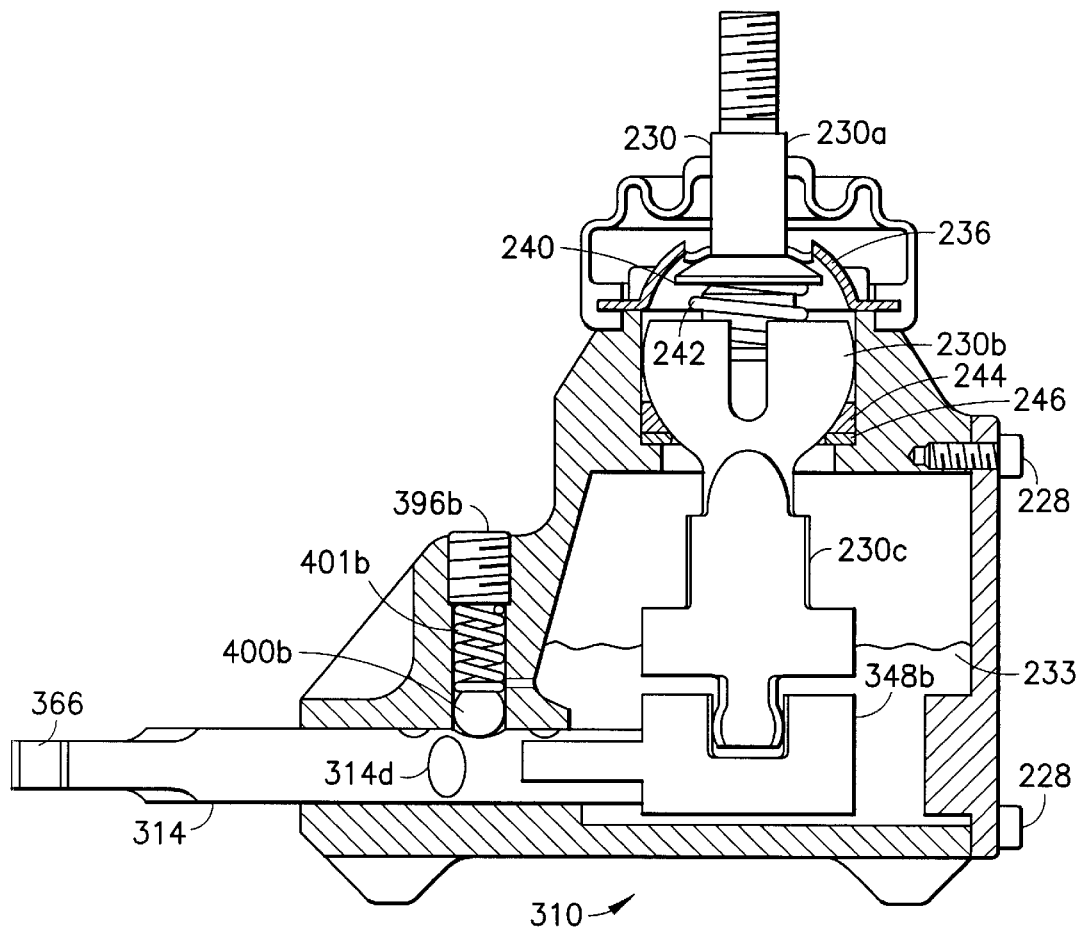
FIG. 21 is a side cross-sectional view of the externally mounted transmission shift mechanism taken along line E—E in FIG. 20.
Figure 22:
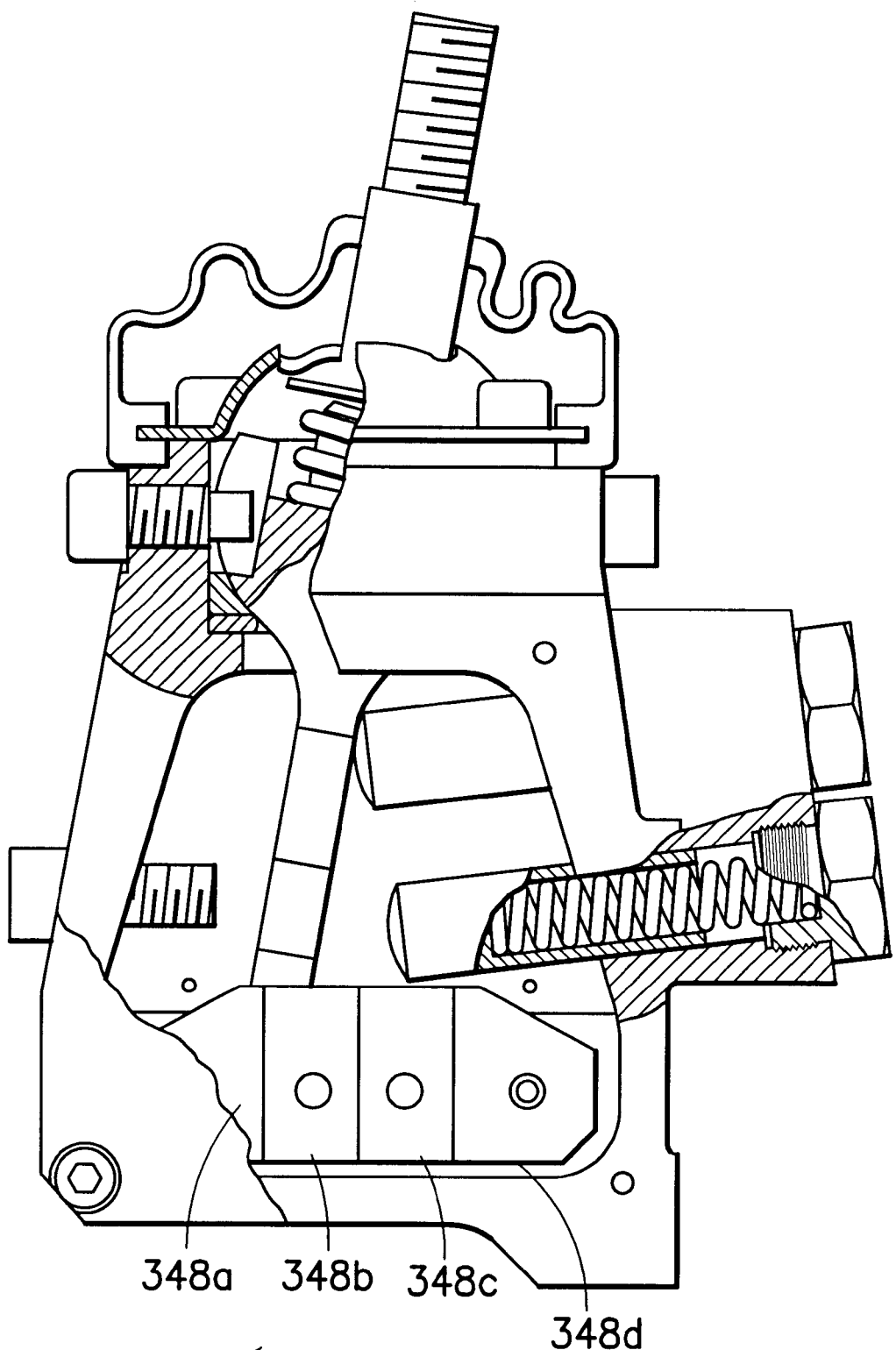
FIG. 22 is a broken open rear view of the externally mounted transmission shift mechanism showing element structure and cross sections taken along line F—F in FIG. 20.
Figure 23A:
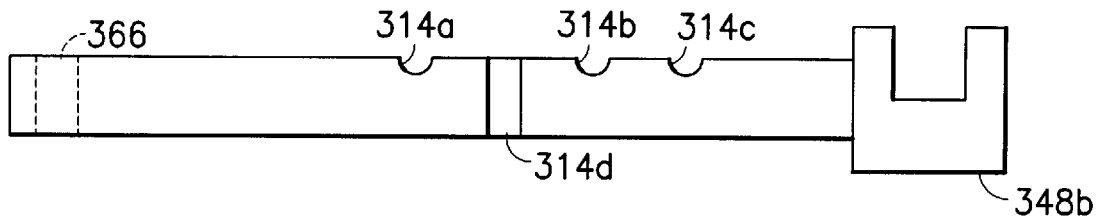
FIG. 23A is a side elevational view of a shift rail for use with the externally mounted transmission shift mechanism illustrated in FIG. 20.
Figure 23B:
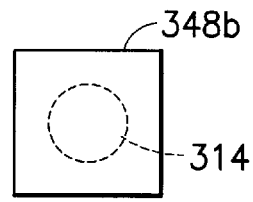
FIG. 23B is a rear elevational view of a shift rail for use with the externally mounted transmission shift mechanism illustrated in FIG. 20.
Figure 23C:
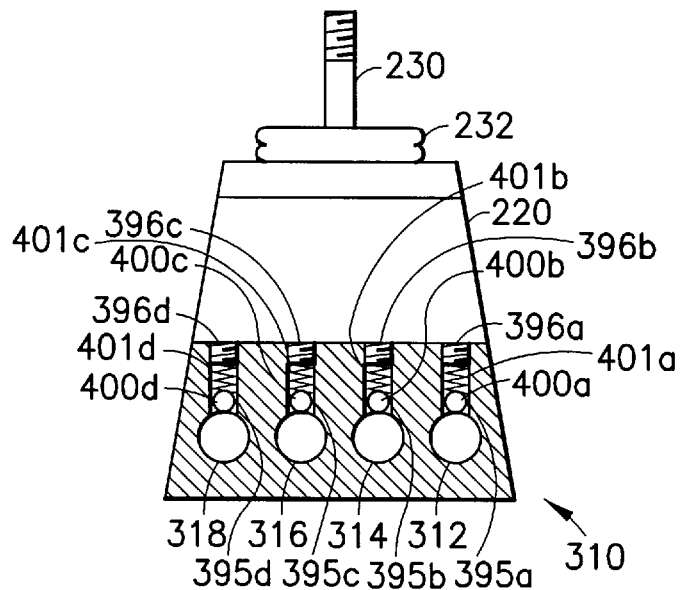
FIG. 23C is a front cross-sectional view of a shift rail for use with the externally mounted transmission shift mechanism taken along line G—G in FIG. 20.

FIG. 20 is a top plan view of the externally mounted transmission shift mechanism with four shift rails. FIG. 21 is a side cross-sectional view of the externally mounted transmission shift mechanism taken along line E—E in FIG. 20. FIG. 22 is a broken open rear view of the externally mounted transmission shift mechanism showing element structure and cross sections taken along line F—F in FIG. 20. FIG. 23A is a side elevational view of a shift rail attached to a rail engagement end for use with the externally mounted transmission shift mechanism illustrated in FIG. 20. FIG. 23B is a rear elevational view of a shift rail attached to a rail engagement end for use with the externally mounted transmission shift mechanism illustrated in FIG. 20. FIG. 23C is a front cross-sectional view of a shift rail for use with the externally mounted transmission shift mechanism taken along line G—G in FIG. 20.

As stated above, FIG. 20 illustrates a top plan view of the externally mounted transmission shift mechanism 310 with four shift rails 312, 314, 316, and 318. (Note that many of the reference numerals in FIGS. 20–24F will correspond to the same reference numerals used in the description of FIGS. 13–19E). Shift rail 312 represents fifth and sixth gear operation, shift rail 314 represents third and fourth operation gears, shift rail 316 represents first and second gear operation, and shift rail 318 represents reverse gear operation. (The gear operation order of these rails may be changed depending on the particular application). The four shift rails include three lock-out plungers 330, 332, and 334 and include lock-out detents 312d, 314d, 314e, 316d, 316e, and 318d. Shift rails 312, 314, 316, and 318 include bosses or holes 364, 366, 368, and 370, respectively, for attachment to the selector rods (not shown). As shown in FIG. 22 each of the four shift rails 312, 314, 316, and 318 connect with rail engagement ends 348a, 348b, 348c, and 348d.

FIG. 23A shows a side view of shift rail 314 with the attached rail engagement end 348b. FIG. 23B shows an axial view of the attached engagement end 348b and shift rail 314. FIG. 23C shows detent ball bearings 400a, 400b, 400c, and 400d engaged with each of the four shift rails 312, 314, 316, and 318. FIG. 23C also shows ball bearing hole 356b including a detent ball 400b, spring 401b, and threaded cap 396b. (Detent balls 400a and 400c, elastic members 401a and 401c, and threaded caps 396a and 396c are similar in structure to detent ball 400b, elastic member 400b, and threaded cap 396b and are shown in their respective positions in FIG. 23C). The detent ball bearing 400b is therefore forced by compression spring 401b against the top surface of shift rail 314.

Figure 24A:
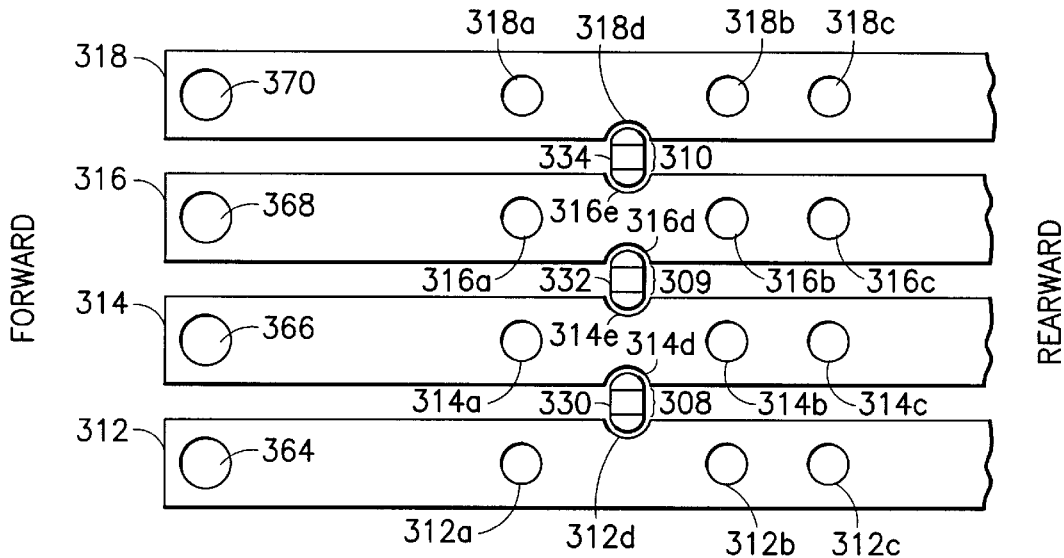
FIG. 24A is a front elevational view of corresponding externally mounted transmission shift mechanism rails in neutral.
Figure 24B:
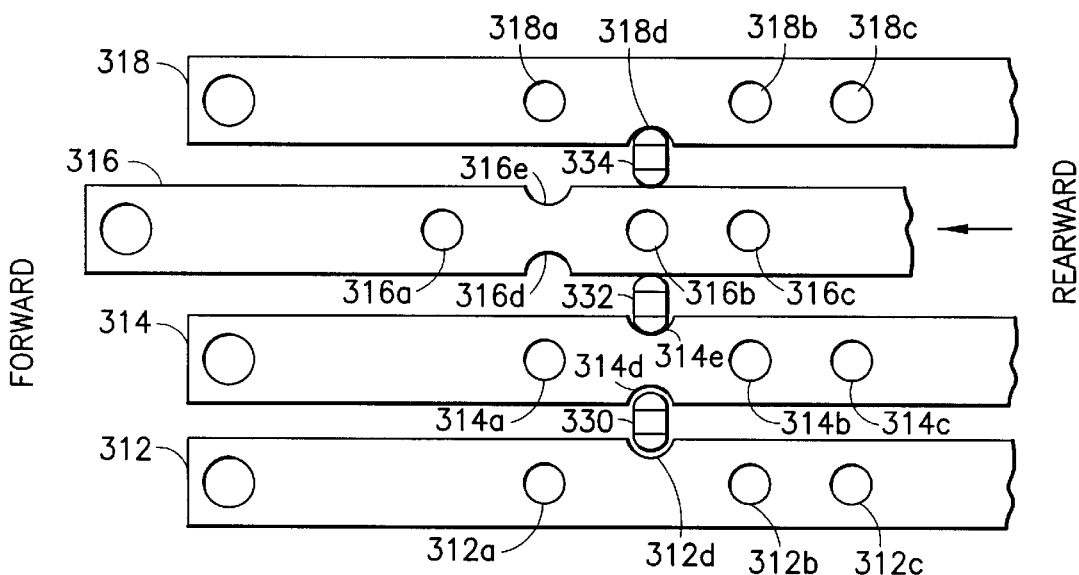
FIG. 24B is a front elevational view of corresponding externally mounted transmission shift mechanism rails in first or second speed operation.

FIGS. 24A–24D show the operation of the shift mechanism 310 in accordance with the 4 shift rail embodiment. For example, FIG. 24A shows the shift rails 312, 314, 316, and 318 when the gear lever 230 is in neutral. FIG. 24B shows movement of the gear lever 230 by the operator to a position corresponding to second speed which causes the lower portion of the gear lever 230 to slide into rail engagement end 348c and drive shift rail 316 to slide axially within the passage 316p. Axial movement of shift rail 316 causes lock-out plunger 334 to seat itself within lock-out detent 318d of shift rail 318, thereby preventing shift rail 318 from moving axially out of the neutral position until such time as shift rail 316 returns to the neutral position. Similarly, axial movement of shift rail 314 causes lock-out plunger 332 to seat itself within lock-out detent 314e of shift rail 314, thereby preventing shift rail 314 from moving axially out of the neutral position until such time as shift rail 316 returns to the neutral position. Shift rail 316 continues to move axially until the detent bearing ball 400c seats itself in detent 316c. The distance traveled by the shift rail 316 corresponds to the distance between the neutral detent 316b and detent 316c.

Furthermore, upon appropriate positioning of the gear level 230 to select a neutral gear, lower portion of the gear lever 230c moves rail engagement end 348b and, therefore, shift rail 316 back to a neutral position as shown in FIG. 24A. In this neutral position, detent ball bearing 400c is seated in neutral detent 316b and the lock-out detents 312d, 314d, 314e, 316d, 316e, and 318d are all directly aligned in facing relationship with one another.

Figure 24C:
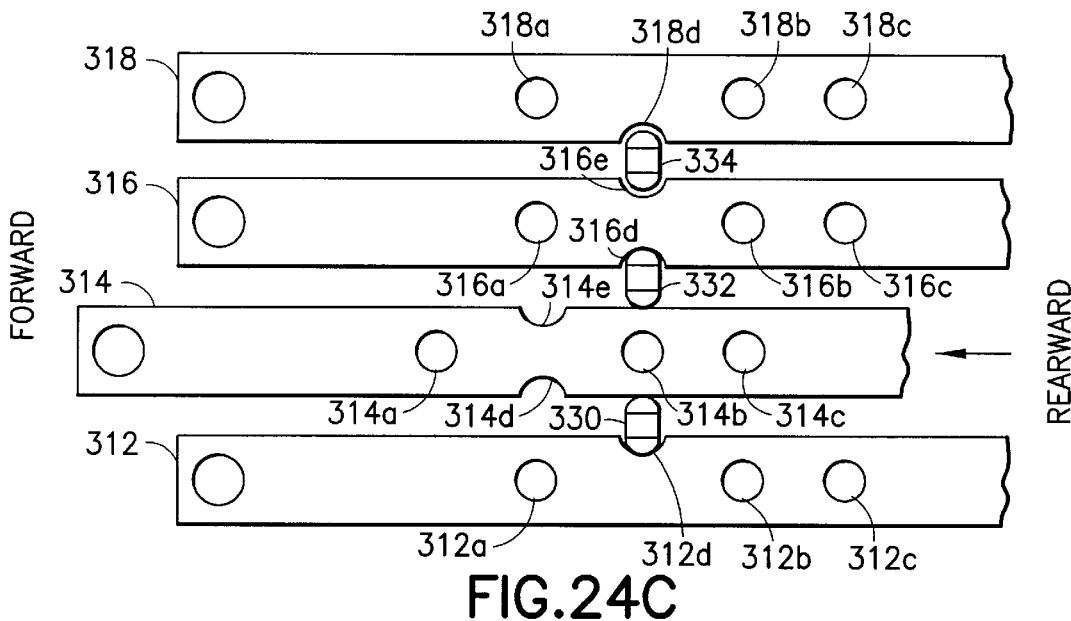
FIG. 24C is a front elevational view of corresponding externally mounted transmission shift mechanism rails in third or fourth speed operation.

Positioning of the gear lever 230 to select the fourth gear of operation is shown in FIG. 24C. Lower portion of the gear lever 230c is moved into the rail engagement end 348b of shift rail 314 which in turn causes shift rail 314 to slide axially past the neutral position until the detent ball bearing 400b seats itself in detent 314c. Axial movement of shift rail 314 causes lock-out plunger 332 to seat itself within lock-out detent 316d of shift rail 316, thereby preventing shift rail 316 from moving axially out of the neutral position until such time as shift rail 314 returns to the neutral position. At the same time, shift rail 312 does not move in the axial direction because lock-out plunger 330 which is seated in lock-out detent 312d prevents movement of shift rail 312 out of the neutral position until such time as shift rail 314 returns to the neutral position. Shift rails 312, 316, and 318 are also held in position by the ball bearings 400a, 400c, and 400d which lock into detents 312b, 316b, and 318b respectively.

As mentioned above, shift rail 314 continues to move axially until the detent bearing ball 400b seats itself in detent 314c. The distance traveled by the shift rail 314 corresponds to the distance between the neutral detent 314b and detent 314c and is enough to shift the gears of the transmission into fourth gear.

Figure 24D:
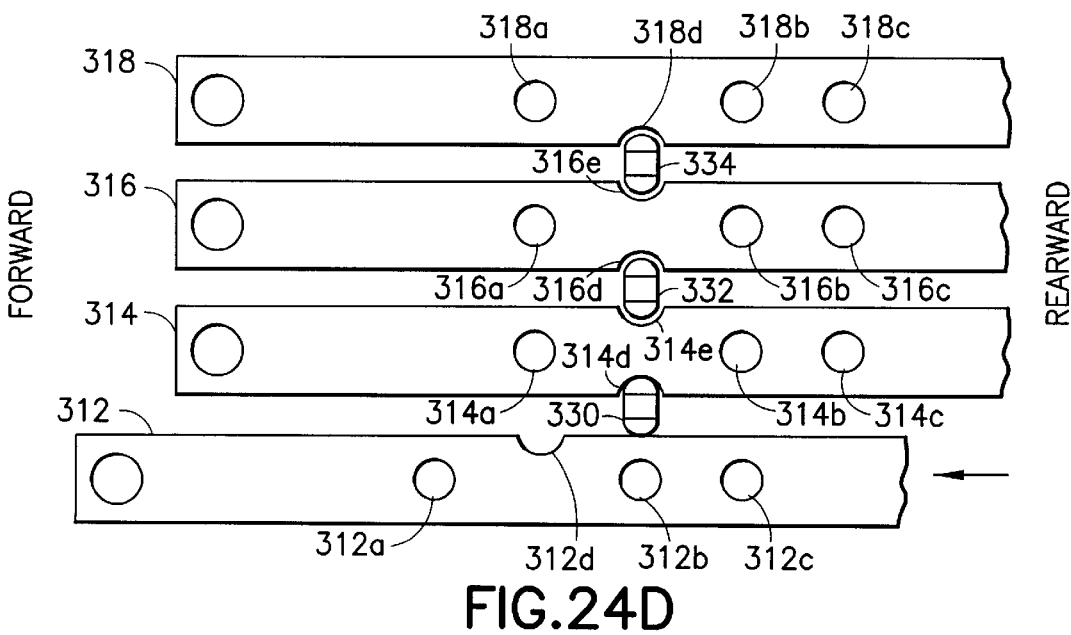
FIG. 24D is a front elevational view of corresponding externally mounted transmission shift mechanism rails in fifth or sixth speed operation.

Furthermore, upon appropriate positioning of the gear level 230 to select a sixth speed operation from the fourth speed operation position, lower portion of the gear lever 230c moves rail engagement end 348b and, therefore, also shifts rail 314 back to a neutral position as shown in FIG. 24A. In this neutral position, detent ball bearing 400b is seated in neutral detent 314b and the lock-out detents 312d, 314d, 314e, 316d, 316e, and 318d are all directly aligned in facing relationship with one another. The lower portion of the gear lever 230c then moves over to rail engagement end 348a and moves shift rail 312 in the axial direction. FIG. 24D illustrates the positioning of the shift rails 312, 314, 316, and 318 as the sixth gear position is entered into. Shift rail 312 slides axially past the neutral position until detent ball bearing 400a seats itself in detent 312c. Axial movement of shift rail 312 causes lock-out plunger 330 to seat itself within lock-out detent 314d of shift rail 314, thereby preventing shift rail 314 from moving axially out of the neutral position until such time as shift rail 312 returns to the neutral position. At the same time, shift rails 316 and 318 do not move in the axial direction because of lock-out plunger 332 which is seated between lock-out detents 314e and 316d which prevents movement of shift rail 316 out of the neutral position and lock-out plunger 334 which is seated between lock-out detents 316e and 318d to prevent movement of shift rail 318 out of the neutral position until such time as shift rail 312 returns to the neutral position. Shift rails 314, 316, and 318 are also held in position by the ball bearings 400b, 400c, and 400d which lock into detents 314b, 316b, and 318b, respectively.

Figure 24E:
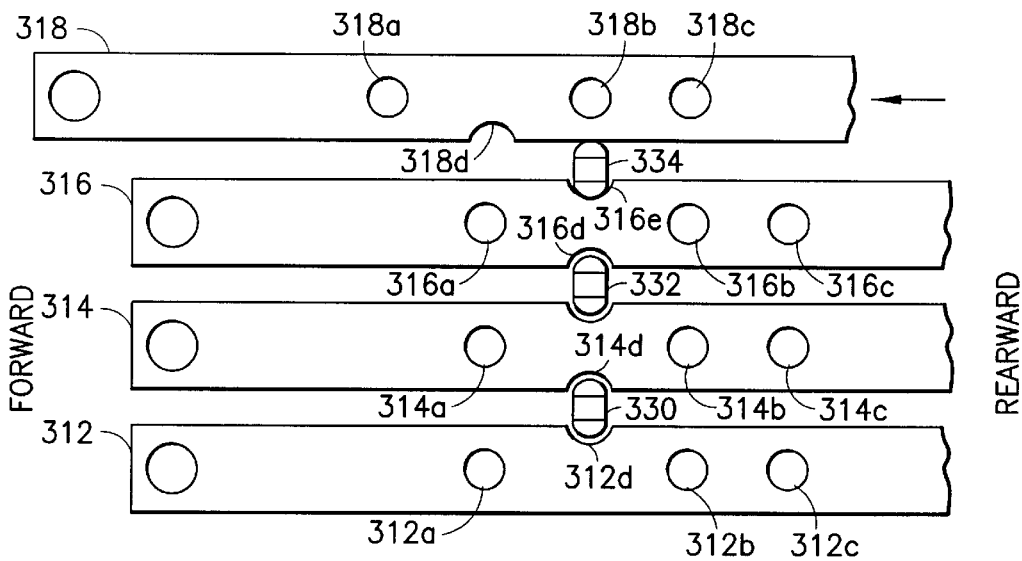
FIG. 24E is a front elevational view of corresponding externally mounted transmission shift mechanism rails in reverse operation.

Furthermore, upon appropriate positioning of the gear level 230 to select a reverse speed of operation, gear lever portion 230c moves over to rail engagement end 348d and moves shift rail 318 in the axial direction. FIG. 24E illustrates the positioning of the shift rails 312, 314, 316, and 318 as the reverse gear position is entered into. Shift rail 318 slides axially past the neutral position until detent ball bearing 400d seats itself in detent 318c. Axial movement of shift rail 318 causes lock-out plunger 334 to seat itself within lock-out detent 316e of shift rail 316, thereby preventing shift rail 316 from moving axially out of the neutral position until such time as shift rail 318 returns to the neutral position. At the same time, shift rails 312 and 314 do not move in the axial direction because of lock-out plunger 332 which is seated between lock-out detents 316d and 314e to prevent movement of shift rail 314 out of the neutral position and lock-out plunger 330 which is seated between lock-out detents 312d and 314d to prevent movement of shift rail 312 out of the neutral position until such time as shift rail 318 returns to the neutral position. Shift rails 312, 314, and 316 are also held in position by the ball bearings 400a, 400b, and 400c which lock into detents 312b, 314b, and 316b, respectively.

Figure 24F:
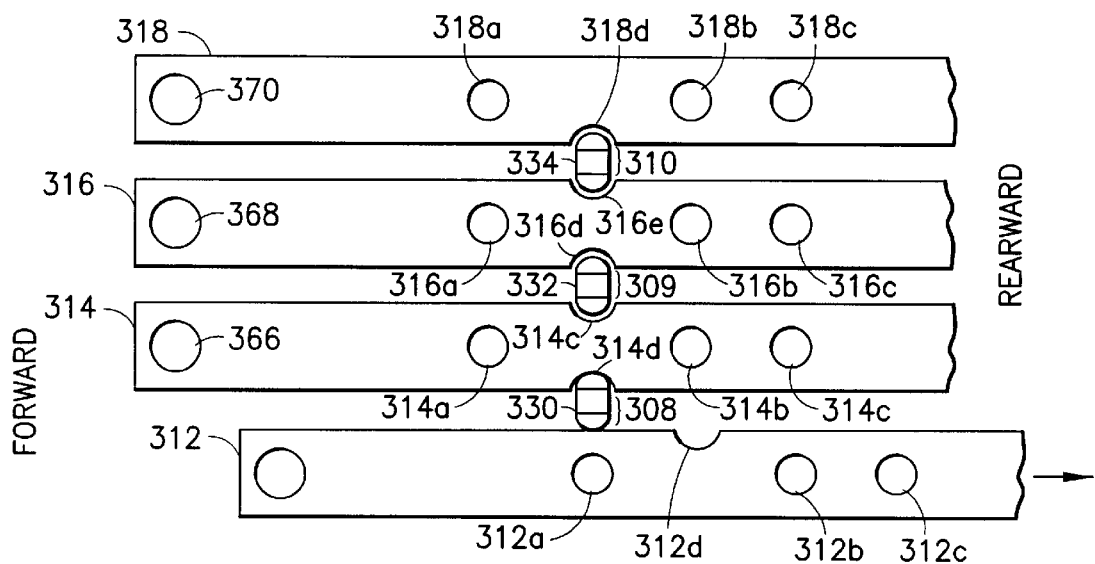
FIG. 24F is a front elevational view of corresponding externally mounted transmission shift mechanism in fifth or sixth speed operation.

Furthermore, upon appropriate positioning of the gear lever 230 to select a fifth speed of operation, gear lever portion 230c moves over to rail engagement end 348a and moves shift rail 312 in the axial direction. FIG. 24F illustrates the positioning of the shift rails 312, 314, 316, and 318 as the fifth gear position is entered into. Shift rail 312 slides axially from the neutral position until detent ball bearing 400a seats itself in detent 312a. Axial movement of shift rail 312 causes lock-out plunger 330 to seat itself within lock-out detent 314d of shift rail 314, thereby preventing shift rail 314 from moving axially out of the neutral position until such time as shift rail 312 returns to the neutral position. At the same time, shift rails 316 and 318 do not move in the axial direction because of lock-out plunger 332 which is seated between lock-out detents 316d and 314e to prevent movement of shift rails 314 and 316 out of the neutral position and lock-out plunger 334 which is seated between lock-out detents 316e and 318d to prevent movement of shift rails 316 and 318 out of the neutral position until such time as shift rail 312 returns to the neutral position. Shift rails 314, 316, and 318 are also held in position by the ball bearings 400b, 400c, and 400d which lock into detents 314b, 316b, and 318b, respectively. Shift rail 312 proceeds in the rearward direction until ball bearing 400a locks into detent 312a.

It is an advantage of the external shifters 210 and 310 that the shifters will typically last much longer than most shifters. This is partially due to the precision of the parts used and also partially due to the sealed nature of the casing which may guard against environmental hazards such as moisture, exhaust, etc. The tolerances on many of the parts in the external shifters 210 and 310 may be constructed using tolerances in the range of approximately +0.0015 to −0.0015. Parts which may be manufactured using this approximate tolerance level include, but are not limited to, the shift rails, the ball bearings, the gear lever, the plungers (250) and the parts located therein, the rail engagement ends, the stop 256, the lock-out plungers, the elastic members (301*a–c,* 401*a–d,* and 242), the cover 236, and the inner plate 240. Parts manufactured using tolerances in the range of approximately +0.0015 to −0.0015 may be defined as "precision" parts. One way of manufacturing the parts used in the external transmission shifter 210 to obtain the precision required would be to machine the parts. (The terms "machine" or "machining" or "machined" are defined to include, but not limited to, processing by or as if by machine, and especially to reduce or finish by or as if by turning, shaping, planing, reaming, milling, or grinding by machine-operated tools). The sealed casing would allow in an alternative embodiment for viscous liquid such as oil or grease (233 as shown in FIGS. 16 and 21) to be placed in the chamber 231 of the casing to insure lubrication of the parts. Passage 293 would allow the viscous liquid to flow to the ball bearing and spring and keep them well-lubricated.

Although the external shifting mechanism has been described herein with reference to 3 and 4 shifting rails, the number of shifting rails may range as high as 5 to implement the particular application.

Although illustrative embodiments have been described herein in detail, it should be noted and will be appreciated by those skilled in the art that numerous variations may be made within the scope of this invention without departing from the principle of this invention and without sacrificing its chief advantages. For instance, it is understood that the present invention is not limited to a four and six speed transmissions and that the invention is equally applicable to transmissions having more than or less than four speeds. The terms and expressions have been used herein as terms of description and not terms of limitation. There is no intention to use the terms or expressions to exclude any equivalents of features shown and described or portions thereof and this invention should be defined in accordance with the claims which follow.

I claim:

1. An apparatus comprising:

a gear selecting lever mounted in a casing located remote from a transmission housing;

a first, second, and third shift rails operatively connected between the gear selecting lever and the transmission housing; and said first, second and third shift rails including lock-out detents located in the casing.

2. The apparatus of claim 1, wherein the first and second lock-out detents are in a facing relationship.

3. The apparatus of claim 1, further comprising:

a first lock-out plunger positioned between the first and second shift rails; and the first lock-out plunger moving between first and second locking positions only when the first and second shift rails are in a neutral position.

4. The apparatus of claim 3, wherein when in the first locking position, the lock-out plunger engages the first locknut detent to restrict movement of the first shift rail without impeding movement of the second shift rail.

5. The apparatus of claim 4, wherein when in the second locking position, the lock-out plunger engages the second lock-out detent to restrict movement of the second shift rail without impeding movement of the first shift rail.

6. The apparatus of claim 1, further comprising:

first, second, and neutral detents on the first shift rail for engaging a first bearing member.

7. The apparatus of claim 6, wherein the first, second, and neutral detents are located on an upper surface of the first shift rail.

8. The apparatus of claim 6, further comprising:

first, second and neutral detents on the second shift rail for engaging a second bearing member.

9. The apparatus of claim 6, further comprising:

a first spring biasing the first bearing member against the first shift rail.

10. The apparatus of claim 9, further comprising:

a second spring biasing a second bearing member against the second shift rail.

11. The apparatus of claim 6, wherein the first beating member engages the first detent when the gear selecting lever is in a rearward gear position.

12. The apparatus of claim 11, wherein the first bearing member engages the second detent when the gear selecting lever is in a forward gear position.

13. The apparatus of claim 1, further comprising:

a second lock-out plunger positioned between the second and third shift rails; and the second lock-out plunger moving between a third and fourth locking position only when the second and third shift rails are in a neutral position.

14. The apparatus of claim 13, wherein when in the third locking position, the second lock-out plunger engages the third lock-out detent to restrict axial movement of the second shift rail without impeding movement of the third shift rail.

15. The apparatus of claim 13, wherein when in the fourth locking position, the second lock-out plunger engages the fourth lock-out position to restrict axial movement of the third shift rail without impeding movement of the second shift rail.

16. The apparatus of claim 13, further comprising:

a fourth shift rail operatively connected to the gear selecting lever and including a lock-out detent.

17. The apparatus of claim 16, wherein the fourth shift rail is a reverse gear.

18. The apparatus of claim 16, further comprising:

a third lock-out plunger located between a third and fourth shift rail.

19. An apparatus comprising:

a gear selecting lever mounted in a casing located remote from a transmission housing;

a first and second shift rails operatively connected between the gear selecting lever and the transmission housing;

said first and second shift rails including first and second lock-out detents located in the casing;

first, second, and neutral detents on the first shift rail for engaging a first bearing member;

wherein the first bearing member engages the first detent when the gear selecting lever is in a rearward gear position; and the first bearing member engages the second detent when the gear selecting lever is in a forward gear position.

20. An apparatus comprising:

a gear selecting lever mounted in a casing located remote from a transmission housing;

a first, second and third shift rails operatively connected between the gear selecting lever and transmission housing;

said first, second and third shift rails including lock-out detents located in the casing;

a lock-out plunger positioned between the second and third shift rails; and the lock-out plunger moving between locking positions only when at least two of said shift rails are in a neutral position.

21. An apparatus comprising:

a gear selecting lever mounted in a casing located remote from a transmission housing;

a first, second, third, and fourth shift rails operatively connected between the gear selecting lever;

said first, second, third and fourth shift rails including lock-out detents located in the casing.

* * * * *